(12) United States Patent
Takahashi et al.

(10) Patent No.: US 6,679,050 B1
(45) Date of Patent: Jan. 20, 2004

(54) EXHAUST EMISSION CONTROL DEVICE FOR INTERNAL COMBUSTION ENGINE

(75) Inventors: Hideaki Takahashi, Yokohama (JP); Kimiyoshi Nishizawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/527,519

(22) Filed: Mar. 16, 2000

(30) Foreign Application Priority Data

Mar. 17, 1999 (JP) .......................................... 11-072319

(51) Int. Cl.$^7$ ................................................ F01N 3/00
(52) U.S. Cl. ............................ 60/285; 60/284; 60/300; 60/301
(58) Field of Search ...................... 60/285, 295, 299, 60/301, 284, 300

(56) References Cited

U.S. PATENT DOCUMENTS

| | | | | |
|---|---|---|---|---|
| 5,462,039 A | * | 10/1995 | Mamiya et al. ............. | 123/686 |
| 5,570,574 A | * | 11/1996 | Yamashita et al. ............. | 60/276 |
| 5,974,788 A | * | 11/1999 | Hepburn et al. ............. | 60/274 |
| 6,058,700 A | * | 5/2000 | Yamashita et al. ............. | 60/285 |
| 6,119,450 A | * | 9/2000 | Boegner et al. ............. | 60/274 |
| 6,161,378 A | * | 12/2000 | Hanaoka et al. ............. | 60/286 |
| 6,164,064 A | * | 12/2000 | Pott ............................. | 60/274 |
| 6,205,773 B1 | * | 3/2001 | Suzuki ......................... | 60/276 |
| 6,205,776 B1 | * | 3/2001 | Otsuka ........................ | 60/274 |
| 6,237,330 B1 | * | 5/2001 | Takahashi et al. ............ | 60/285 |

FOREIGN PATENT DOCUMENTS

| | | |
|---|---|---|
| EP | 0 899 430 A2 | 3/1999 |
| EP | 0 950 803 A2 | 10/1999 |
| JP | 6-336916 | 12/1994 |
| JP | 10-54274 | 2/1998 |
| JP | 2000-337137 A | 12/2000 |
| WO | WO 98/46868 | 10/1998 |

\* cited by examiner

Primary Examiner—Thomas Denion
Assistant Examiner—Diem Tran
(74) Attorney, Agent, or Firm—Foley & Lardner

(57) ABSTRACT

The exhaust pipe (7) of an engine (1) is provided with a front three-way catalyst (8) and a rear three-way catalyst (9). A controller (6) determines whether temperature rise conditions in the rear three-way catalyst (9) are satisfied. When temperature rise conditions in the rear three-way catalyst (9) are satisfied, the air-fuel ratio of the exhaust gas flowing into the front three-way catalyst (8) is made to fluctuate periodically to rich or lean about the stoichiometric air-fuel ratio, and the amplitude of air-fuel ratio fluctuation is increased. In this way, temperature rise of the front three-way catalyst (8) is suppressed, and the temperature of the rear three-way catalyst (9) rises.

21 Claims, 23 Drawing Sheets

EXHAUST EMISSION CONTROL DEVICE FOR INTERNAL COMBUSTION ENGINE

FIELD OF THE INVENTION

The present invention relates to an exhaust emission control device for an internal combustion engine.

BACKGROUND OF THE INVENTION

Some catalysts for purifying the exhaust gas of an internal combustion engine absorb NOx in exhaust gas when the air-fuel ratio is leaner than the stoichiometric air-fuel ratio. When the oxygen concentration of the exhaust gas falls, i.e. when the air-fuel ratio changes over to stoichiometric or rich, the NOx absorbed on the catalyst is desorbed, and the desorbed NOx is reduced by HC and CO which are present in the exhaust gas (JPA 6-336916 published in 1994).

However, engine fuel or lubricating oil generally contains sulfur, and SOx (sulfur oxides) in the exhaust gas tends to be absorbed by or deposit on the catalyst more easily when the vehicle is being driven for long periods of time at a lean air-fuel ratio. If a large amount of SOx is deposited on the catalyst, absorption of NOx declines and exhaust gas purification performance is considerably impaired.

The SOx deposited on the catalyst is discharged from the catalyst when the catalyst temperature rises above its usual level. Hence, when the amount of SOx deposited on the catalyst increases, the catalyst temperature is increased to remove SOx.

In JPA 10-54274 (published in 1998), when the amount of SOx deposited on the catalyst increases and absorption of NOx by the catalyst declines, lean misfire of the engine is performed for a predetermined time. Due to this, the level of partial combustion increases in the exhaust gas, the temperature of the catalyst increases when these unburnt components are burnt in the catalyst, and SOx is discharged.

Alternatively, the ignition timing of the engine is retarded to increase the temperature of the exhaust gas and discharge SOx from the catalyst.

SUMMARY OF THE INVENTION

However, although the temperature increase effect is large when a lean misfire is performed and unburnt components are burnt in the catalyst, it is difficult to correctly control the amount of unburnt components sent to the catalyst, and there is a possibility of the temperature rising too much and impairing the durability of the catalyst.

On the other hand, since the temperature increase due to the retardation angle of the ignition timing raises the catalyst temperature indirectly by raising the exhaust gas temperature, durability is maintained but a sufficient temperature increase for discharging SOx is not necessarily achieved.

A method is known of improving exhaust gas composition immediately after engine startup by installing a three-way catalyst on the upstream side, i.e. in the exhaust manifold, where the temperature after startup increases quickly. However, if an NOx absorption catalyst is also installed downstream of the upstream three-way catalyst and it is attempted to raise the temperature in order to discharge SOx from the downstream catalyst, the temperature of the upstream catalyst increases too much, and these severe temperature conditions lead to early deterioration of the upstream catalyst.

It is therefore an object of the present invention to provide an exhaust emission control device for an internal combustion engine which increases the temperature of a downstream catalyst effectively while avoiding the temperature increase of an upstream catalyst.

In order to achieve above object this invention provides an exhaust emission control device of an internal combustion engine provided with an exhaust gas pipe, comprising a front three-way catalyst disposed in the exhaust gas pipe, a rear three-way catalyst disposed in the exhaust gas pipe, the rear three-way catalyst being provided downstream of the front three-way catalyst, and a microprocessor. The microprocessor is programmed to control the engine so that an air-fuel ratio of the exhaust gas flowing into the front three-way catalyst is made to periodically fluctuate to rich or lean about the stoichiometric air-fuel ratio, and increase the amplitude of air-fuel ratio fluctuation when the temperature of the rear three-way catalyst is raised.

The details as well as other features and advantages of this invention are set forth in the remainder of the specification and are shown in the accompanying drawings.

DESCRIPTION OF THE PREFERRED EMBODIMENTS

Figure 1:
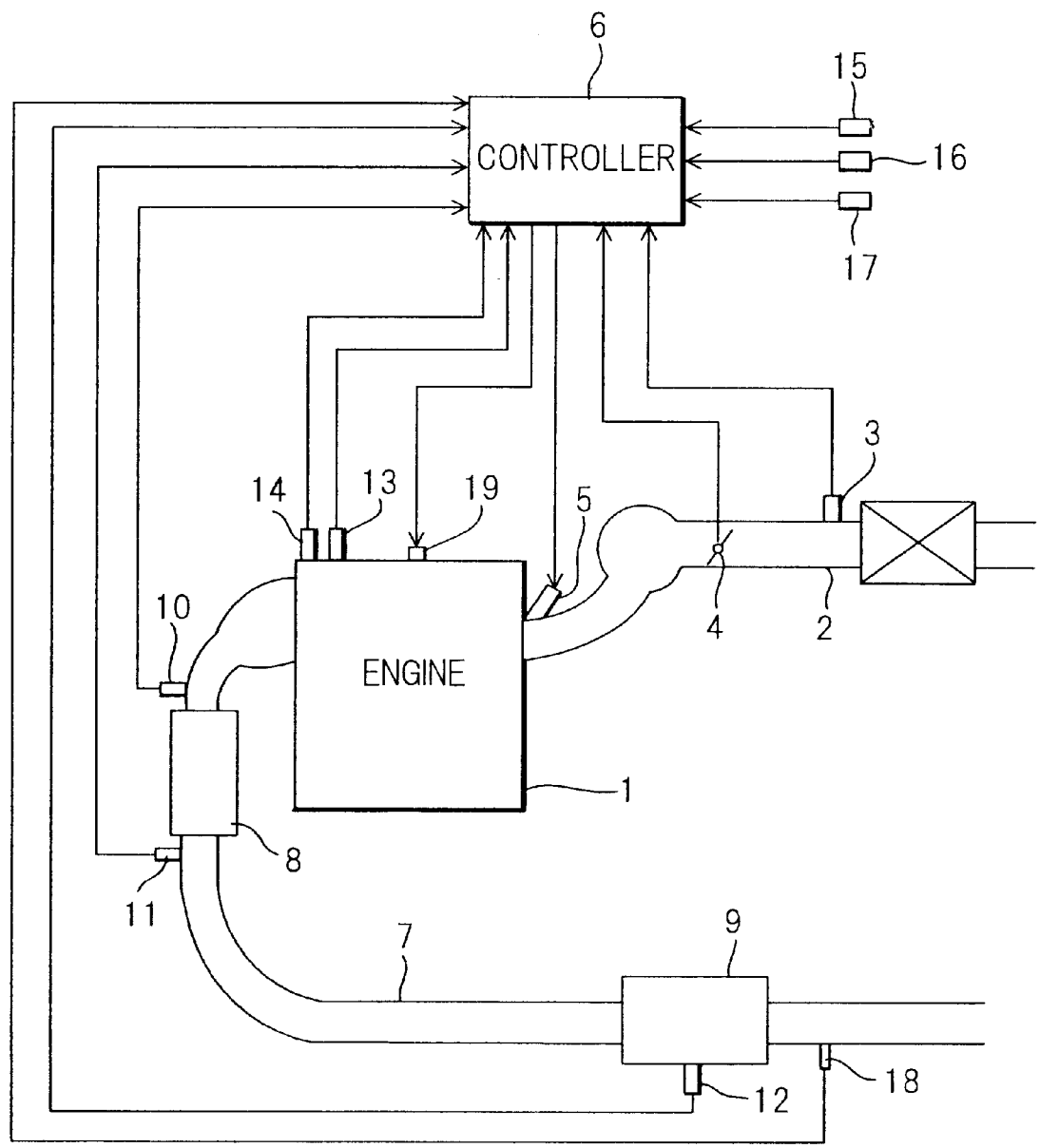
FIG. 1 is a schematic diagram of an engine exhaust emission control device according to this invention.

Referring to FIG. 1 of the drawings, an inlet pipe 2 of an internal combustion engine 1 is provided with an air flow meter 3 which detects an intake air amount, throttle 4 which adjusts the intake air amount, and injector 5 which injects fuel into the inlet pipe 2. The injector 5 may inject fuel directly fuel into a cylinder of an engine 1.

A front three-way catalyst 8 and rear three-way catalyst 9 for exhaust gas purification are provided in series in an exhaust pipe 7 of the engine 1.

The front three-way catalyst 8 performs reduction of NOx in the exhaust gas and oxidation of HC and CO with maximum conversion efficiency when the air-fuel ratio of the inflowing exhaust gas has a stoichiometric air-fuel ratio. The front three-way catalyst 8 traps and stores oxygen in the exhaust gas when the air-fuel ratio is lean, and releases the stored oxygen when the air-fuel ratio of the inflowing exhaust gas is rich (referred to hereafter as "oxygen storage capacity"), as in the case of an ordinary three-way catalyst.

Due to this oxygen storage capacity, the front three-way catalyst 8 can purify NOx, HC and CO well even if the air-fuel ratio of the inflowing exhaust gas has a small periodic fluctuation about the stoichiometric air-fuel ratio.

The rear three-way catalyst 9 located downstream of the front three-way catalyst 8 also has an oxygen storage capacity. The rear three-way catalyst 9 traps and stores NOx in the exhaust gas when the air-fuel ratio of the inflowing exhaust gas is lean (referred to hereafter as "NOx storage capacity"). When the air-fuel ratio of the inflowing exhaust gas is rich, it also has the capacity to reduce NOx by using HC and CO in the exhaust gas. Due to this capacity, when operating the engine 1 at a lean air-fuel ratio, good exhaust gas characteristics can be maintained.

The oxygen storage capacity of the front three-way catalyst 8 is set lower than the oxygen storage capacity of the rear three-way catalyst 9 to increase the amount of HC, CO, NOx and $O_2$ in the exhaust gas passing through the front three-way catalyst 8 when temperature increase control of the rear three-way catalyst 9, described later, is performed.

A front oxygen sensor 10 is provided upstream of the front three-way catalyst 8, and a rear oxygen sensor 11 is provided downstream, respectively. The oxygen sensors 10 and 11 detect whether the air-fuel ratio of the exhaust gas flowing into the front three-way catalyst 8, and the exhaust gas flowing out of the front three-way catalyst 8, is richer or leaner than gas having the stoichiometric air-fuel ratio. Linear air-fuel ratio sensors which can detect the air-fuel ratio continuously may be provided instead of the oxygen sensors 10, 11.

The rear three-way catalyst 9 is provided with a catalyst temperature sensor 12 which detects the temperature of the rear three-way catalyst 9. An NOx sensor 18 which detects the NOx concentration in the exhaust gas is provided downstream of the rear three-way catalyst 9.

A controller 6 comprises a central processing unit, read only memory, random access memory and I/O interface. Signals from the above-mentioned air flow meter 3, oxygen sensors 10, 11, catalyst temperature sensor 12 and NOx sensor 18 are input into the controller 6.

In addition, a cooling water temperature signal from a cooling water temperature sensor 13, Ref signal and Pos signal from a crank angle sensor 14, accelerator depression amount signal from an accelerator position sensor 15, vehicle speed signal from a vehicle speed sensor 16, and engine start signal from a starter switch 17, are input into the controller 6.

The controller 6 controls the above-mentioned throttle 4, injector 5 and an ignition plug 19 based on these various signals.

SOx in the exhaust gas is also trapped and stored in the rear three-way catalyst. However, if the amount of stored SOx in the rear three-way catalyst increases, the NOx storage capacity of the rear three-way catalyst 9 declines.

The controller 6 then estimates the SOx stored in the rear three-way catalyst 9, and determines the conditions of SOx discharge based on the estimated SOx amount. When the SOx discharge conditions are satisfied, the temperature of the rear three-way catalyst 9 is raised, and the stored SOx is discharged.

Specifically, the controller 6 increases the amplitude of the air-fuel ratio fluctuation in air-fuel ratio feedback control, increases the amount of CO, HC, NOx and $O_2$ which passes through the front three-way catalyst 8, and increases the amount of CO, HC, NOx and $O_2$ flowing into the rear three-way catalyst 9. By making them react on the rear three-way catalyst 9, the temperature of the rear three-way catalyst 9 is raised, and the stored SOx is discharged.

At this time, the controller 6 performs feedback control of the median value of air-fuel ratio to the stoichiometric air-fuel ratio so that the oxidation/reduction of HC, CO and NOx is performed with maximum efficiency on the rear three-way catalyst 9 and the heat of reaction is maximized. In addition, the ignition timing of the engine 1 is retarded and the exhaust valve open timing is advanced to enhance the temperature rise effect of the rear three-way catalyst.

Figure 2:
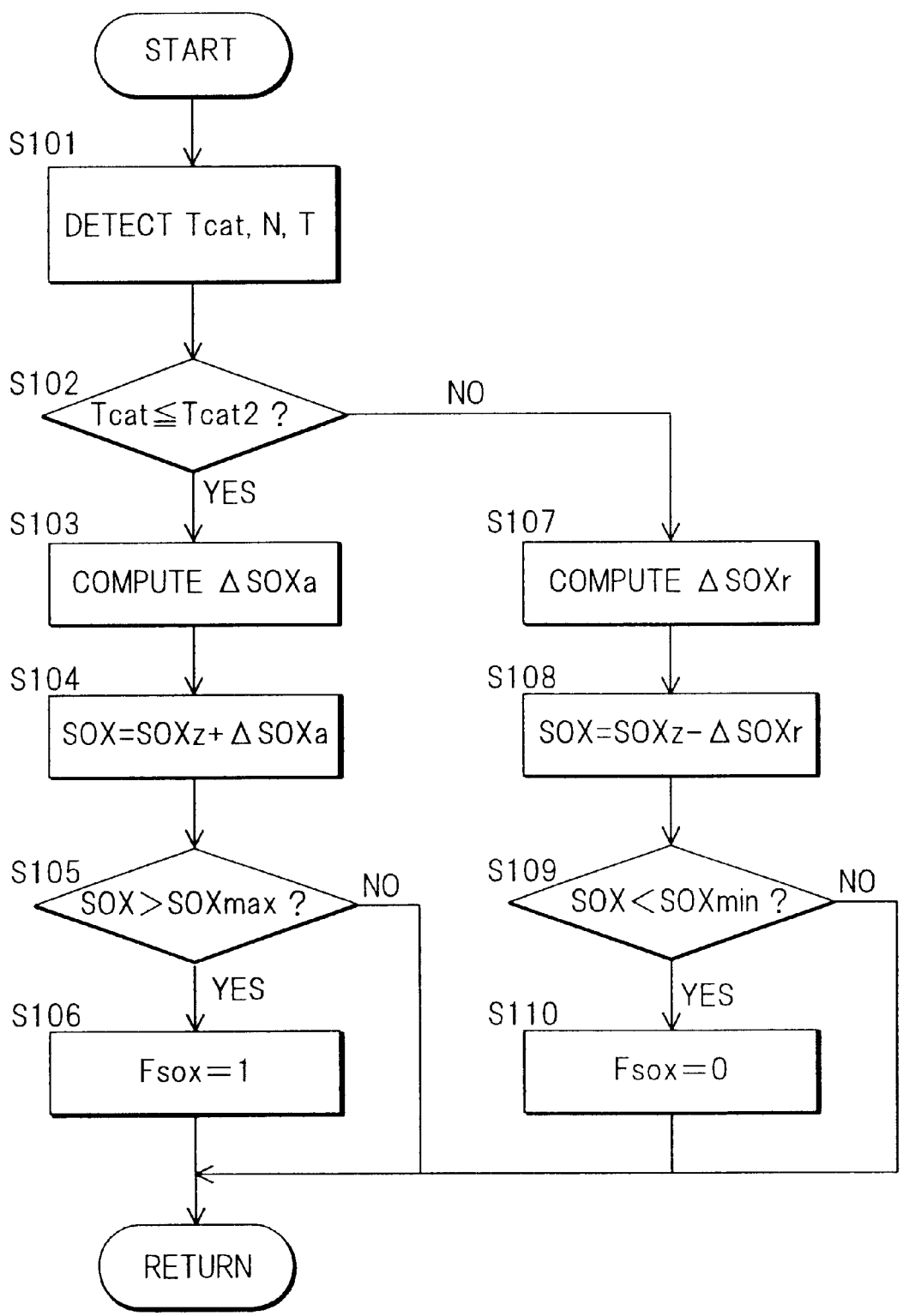
FIG. 2 shows a routine for determining SOx discharge conditions.

FIG. 2 is a routine for determining SOx discharge conditions. This routine is performed by the controller 6 at a predetermined time, for example 10 milliseconds.

Here, the SOx amount stored in the rear three-way catalyst 9 is estimated. Based on the estimated SOx storage amount, it is determined whether SOx discharging conditions are satisfied, and a flag Fsox is set.

First, in a step S101, the output of the catalyst temperature sensor 12 is A/D converted, and the catalyst temperature Tcat of the rear three-way catalyst 9 is calculated. The engine rotation speed N is calculated based on a recurrence interval of a signal (for example, Ref signal) from the crank angle sensor 14. An engine load T (for example, target generated torque of the engine 1 according to an accelerator pedal depression amount) is also calculated based on the output of the accelerator position sensor 15.

In a step S102, it is determined whether or not the catalyst temperature Tcat calculated in the step S101 is below an SOx discharge temperature Tcat2. If the catalyst temperature Tcat is below the SOx discharge temperature Tcat2, it is determined that the rear three-way catalyst 9 is in the SOx trapping state, and the routine proceeds to a step S103. If the catalyst temperature Tcat is larger than the SOx discharge temperature Tcat2, it is determined that the rear three-way catalyst 9 is in the SOx discharging state, and the routine proceeds to a step S107.

In the step S103, an SOx amount ΔSOXa trapped by the rear three-way catalyst 9 in a predetermined time (here, the routine execution time of 10 milliseconds) is computed by the following equation.

$$\Delta SOXa = (SOx \text{ amount flowing into rear three-way catalyst } 9 \text{ in a predetermined time}) \times (SOx \text{ trapping rate of rear three-way catalyst } 9) \quad (1)$$

The SOx amount which flows into the rear three-way catalyst 9 in a predetermined time is computed based on the engine rotation speed N, engine load T and average air-fuel ratio.

The SOx trapping rate of the rear three-way catalyst 9 (SOx amount trapped per unit time/SOx amount flowing in per unit time) is computed based on, for example, the present SOx storage amount SOXz (estimated value of SOx storage amount computed on the immediately preceding occasion), catalyst temperature Tcat and average air-fuel ratio.

A target equivalence ratio TFBYA set by a target air-fuel ratio setting routine, described later, is used as the average air-fuel ratio.

The SOx trapping rate of the rear three-way catalyst 9 is a value ranging from zero to 1, and has the following characteristics.

The SOx trapping rate increases as the SOx storage amount SOX of the rear three-way catalyst 9 decreases. When the SOx storage amount SOX is zero, the SOx trapping rate is a maximum.

The SOx trapping rate is a maximum when the temperature Tcat of the rear three-way catalyst 9 is a predetermined temperature. The SOx trapping rate is smaller when the temperature is lower than the predetermined temperature, and is zero below the catalytic activity temperature. It also becomes smaller if the temperature rises above the predetermined temperature. The SOx trapping rate is zero above the SOx discharge temperature Tcat2.

The SOx trapping rate becomes smaller as the air-fuel ratio displays lower levels of leaness. At a rich air-fuel ratio, the SOx trapping rate is zero.

When the SOx amount ΔSOXa trapped in the predetermined time has been computed, the routine proceeds to a step S104.

In the step S104, ΔSOXa is added to the estimated SOx storage amount SOXz computed on the immediately preceding occasion, and the latest estimated SOx storage amount SOX is computed.

In a step S105, it is determined whether or not the estimated SOx storage amount SOX is larger than a predetermined value SOXmax. If it is larger than the predetermined value SOXmax, the routine proceeds to a step S106.

In the step S106, the Fsox is set to 1 showing that SOx discharge conditions are satisfied. The predetermined value SOXmax is set so that a predetermined NOx storage capacity NOXth remains in the rear three-way catalyst 9.

On the other hand, in a step S107, an SOx amount ΔSOXr discharged from the rear three-way catalyst 9 in a predetermined time (here 10 milliseconds) is computed by the following equation.

$$\Delta SOXr = (\text{predetermined time}) \times (SOx \text{ discharge rate of rear three-way catalyst } 9) \quad (2)$$

Herein, the SOx discharge rate of the rear three-way catalyst 9 is the amount of SOx discharged from the rear three-way catalyst 9 in unit time. The SOx discharge rate is computed from the present SOx storage amount SOXz (estimated value of SOx storage amount computed on the immediately preceding occasion), catalyst temperature Tcat and average air-fuel ratio as parameters.

The target equivalence ratio TFBYA set by a routine described later is used as the average air-fuel ratio. However, as the average air-fuel ratio may be made rich by varying the control center value of air-fuel ratio feedback control while maintaining TFBYA=1 during SOx discharge control, the degree of richness is also considered in this case.

The SOx discharge rate of the rear three-way catalyst 9 has the following characteristics.

The SOx discharge rate decreases as the SOx storage amount SOX of the rear three-way catalyst 9 decreases. When the SOx storage amount SOX is zero, the SOx discharge rate is zero.

The SOx discharge rate is smaller as the catalyst temperature Tcat of the rear three-way catalyst 9 decreases. Below the SOx discharge temperature Tcat2, the SOx discharge rate is zero.

The SOx discharge rate is smaller as the degree of richness decreases. At a lean air-fuel ratio, the SOx discharge rate is zero.

After the SOx amount ΔSOXr discharged from the rear three-way catalyst 9 is computed, the routine proceeds to a step S108. In the step S108, ΔSOXr is subtracted from the estimated SOx storage amount SOXz computed on the immediately preceding occasion, and the newest estimated SOx storage amount SOX is computed.

In a step S109, it is determined whether or not the estimated SOx storage amount SOX is smaller than a predetermined value SOXmin (<SOXmax). When it is smaller than the predetermined value SOXmin, the routine proceeds to a step S110, and the flag Fsox is set to zero showing that SOx discharge conditions are not satisfied. The predetermined value SOXmin is set to a small value near zero.

Therefore, by processing this routine, the trapped SOx amount ΔSOXa or discharge amount ΔSOXr of the rear three-way catalyst 9 per predetermined time is computed based on the catalyst temperature Tcat. The SOx storage amount SOX is estimated by cumulative computation of these amounts.

Once this estimated SOx storage amount SOX exceeds the predetermined value SOXmax, Fsox=1 is maintained until SOx is almost completely discharged. The reason why Fsox=1 is maintained until SOx is almost completely discharged is to prevent frequent starts and stops of SOx discharge control.

The SOx trapped by the rear three-way catalyst 9 is stored in the rear three-way catalyst 9 as it is even after the engine 1 stops, so the estimated SOx storage amount SOX is memorized by the memory of the controller 6 even after the engine stops. The memorized estimated SOx storage amount SOX is read as an initial value of the estimated SOx storage amount SOX next time the engine 1 starts, and is used for subsequent calculation of the estimated SOx storage amount SOX.

Here, the SOx storage amount SOX is estimated by performing a cumulative computation on the SOx trapping amount ΔSOXa and discharge amount ΔSOXr per predetermined time, however the process may be simplified by, for example, omitting the steps S103, S107 and taking ΔSOXa, ΔSOXr as fixed values in the steps S104, S108.

Figure 3:
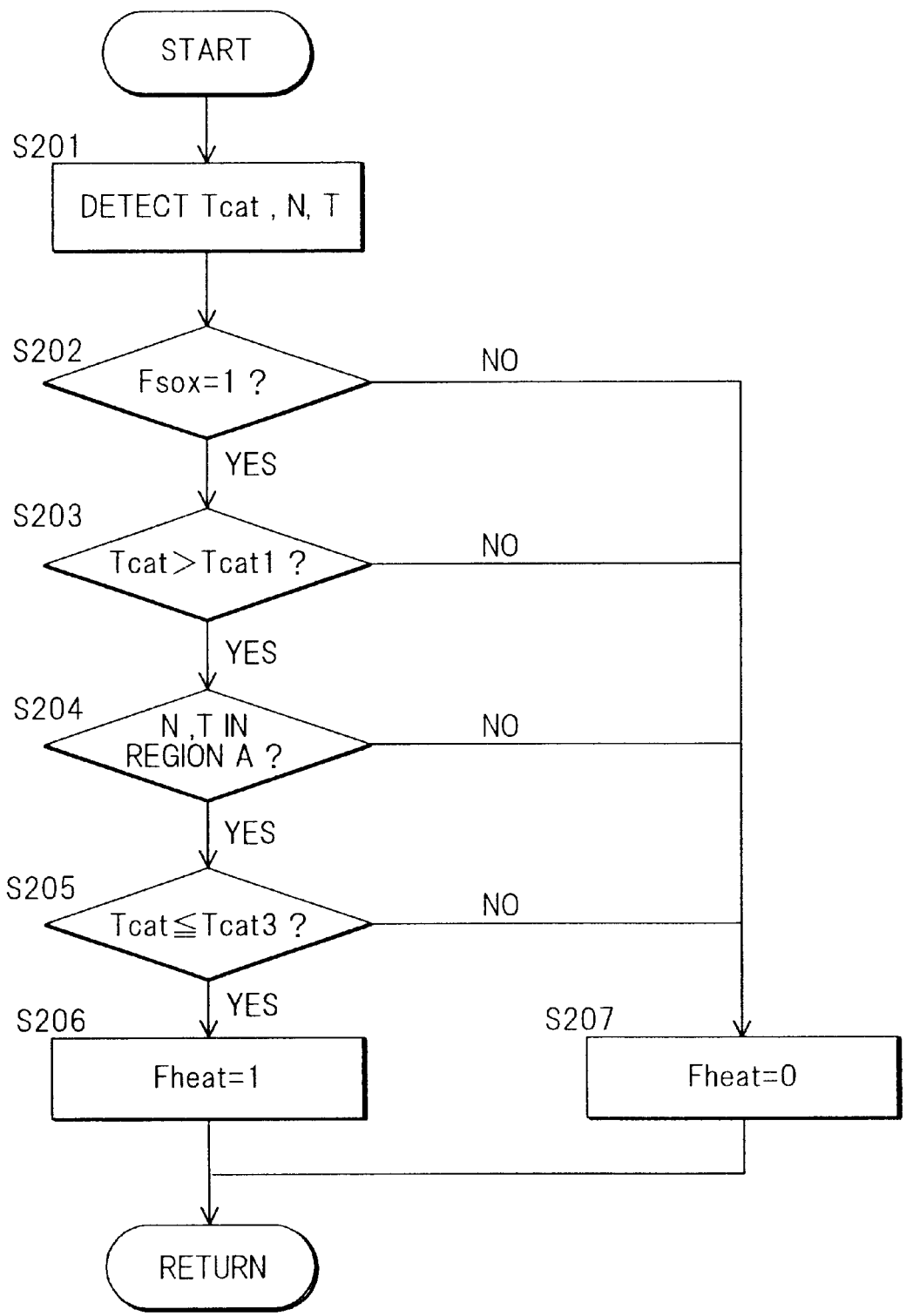
FIG. 3 shows a routine for determining temperature rise conditions.

FIG. 3 is a routine for determining temperature increase conditions. This routine is performed by the controller 6 at a predetermined interval, for example 10 milliseconds.

Here, it is determined whether the conditions for temperature increase of the rear three-way catalyst 9 are satisfied based on the flag Fsox and catalyst temperature Tcat of the rear three-way catalyst 9, and a flag Fheat is set.

First, in a step S201, the output of the catalyst temperature sensor 12 is A/D converted, and the catalyst temperature Tcat of the rear three-way catalyst 9 is calculated. The engine rotation speed N is calculated based on the recurrence interval of a predetermined signal of the crank angle sensor 14. The engine load T is calculated based on the output of the accelerator position sensor 15.

In a step S202, it is determined whether or not conditions for discharge of SOx stored in the rear three-way catalyst 9 are satisfied based on the flag Fsox. When SOx discharge conditions are satisfied (Fsox=1), the routine proceeds to a step S203, and when they are not satisfied (Fsox=0), the routine proceeds to a step S207.

In the step S203, it is determined whether or not the catalyst temperature Tcat is higher than a predetermined temperature Tcat1. If the catalyst temperature Tcat is higher than the predetermined temperature Tcat1, the routine proceeds to a step S204, and when this is not so, the routine proceeds to the step S207.

The predetermined temperature Tcat1 is set to a temperature lower than the SOx discharge temperature Tcat2. If it is attempted to raise the temperature above the SOx discharge temperature Tcat2 when the catalyst temperature Tcat is less than Tcat1, special control for increasing catalyst temperature continues for a long time, and this has a large adverse effect on emissions or fuel consumption. This processing therefore avoids performing temperature increase control below Tcat1.

However, if the engine rotation speed N and engine load T are in a predetermined region (for example, region B of FIG. 4), and it appears that the catalyst temperature would probably increase quickly if temperature increase control were performed, temperature increase control may be permitted even if the catalyst temperature Tcat is less than Tcat1.

Figure 4:
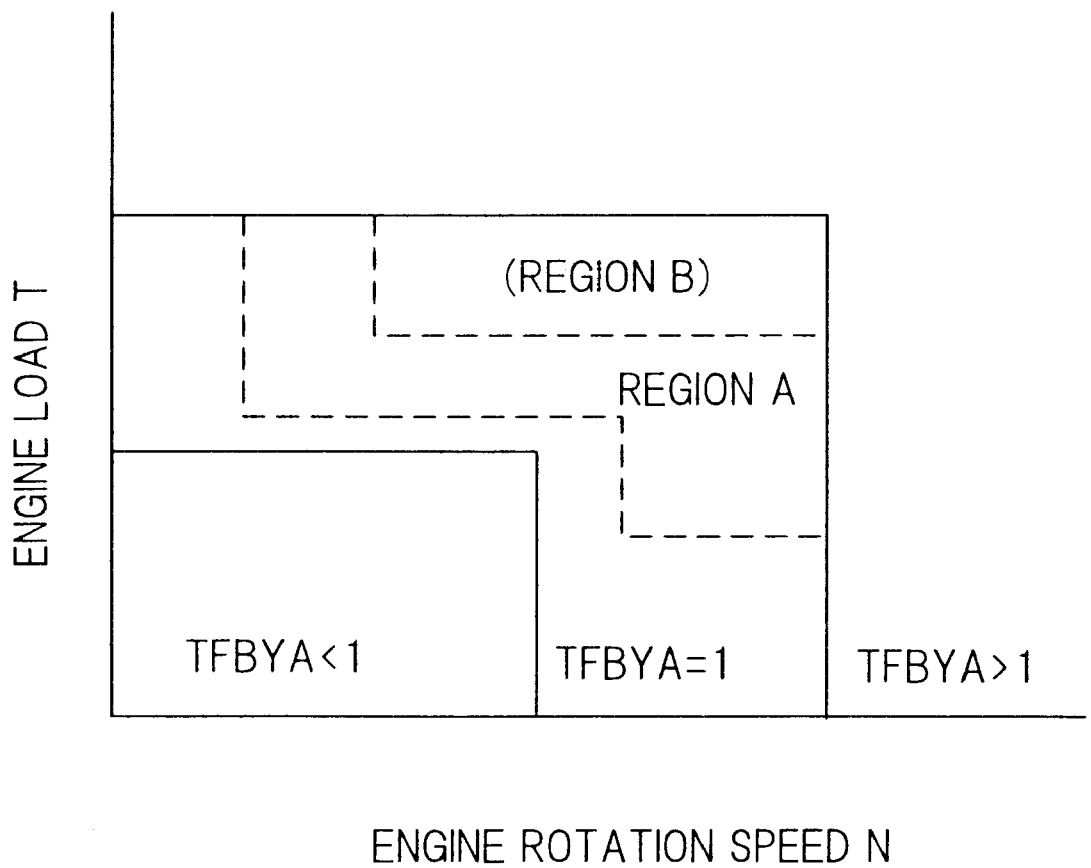
FIG. 4 is a map used for setting a target equivalence ratio.

In a step S204, it is determined whether or not the engine rotation speed N and engine load T are in a region A of FIG. 4. If the engine rotation speed N and engine load T are in the region A, the routine proceeds to a step S205, otherwise it proceeds to a step S207. Region A is a region wherein the catalyst temperature Tcat can be raised to be higher than the SOx discharge temperature Tcat2 when temperature rise control of the rear three-way catalyst 9 is performed.

Depending on the engine, the catalyst temperature Tcat may be raised higher than the SOx discharge temperature Tcat2 even if temperature rise control is performed in a lean air-fuel ratio operating region (TFBYA<1). In such a case, all the regions in which temperature increase is possible may be set as region A, and while conditions for discharging SOx stored in the catalyst (Fsox=1) are satisfied, priority is given to catalyst temperature increase control over lean air-fuel ratio operation.

In a step S205, it is determined whether or not the catalyst temperature Tcat is less than a temperature Tcat3. When it is less than the temperature Tcat3, the routine proceeds to a step S206, otherwise it proceeds to a step S207.

Here, the temperature Tcat3 is set higher than the SOx discharge temperature Tcat2, because the rear three-way catalyst 9 deteriorates more rapidly if the catalyst temperature is increased too much when the catalyst temperature Tcat is higher than Tcat3.

In the step S206, a flag Fheat is set to 1 which shows that temperature increase conditions of the rear three-way catalyst 9 are satisfied. In the step S207, the flag Fheat is set to zero which shows that temperature increase conditions are not satisfied.

Therefore, by performing this routine, it is determined whether temperature increase conditions of the rear three-way catalyst 9 are satisfied based on the flag Fsox, the catalyst temperature Tcat of the rear three-way catalyst 9 and operating conditions. When conditions for increasing the temperature of the rear three-way catalyst 9 are satisfied, the flag Fheat is set to 1, and when they are not satisfied, the flag Fheat is set to zero.

Specifically, when SOx discharge conditions are satisfied, the operating region is in region A and the temperature Tcat of the rear three-way catalyst is between the predetermined temperatures Tcat1 and Tcat3, it is determined that temperature increase conditions are satisfied.

Figure 5:
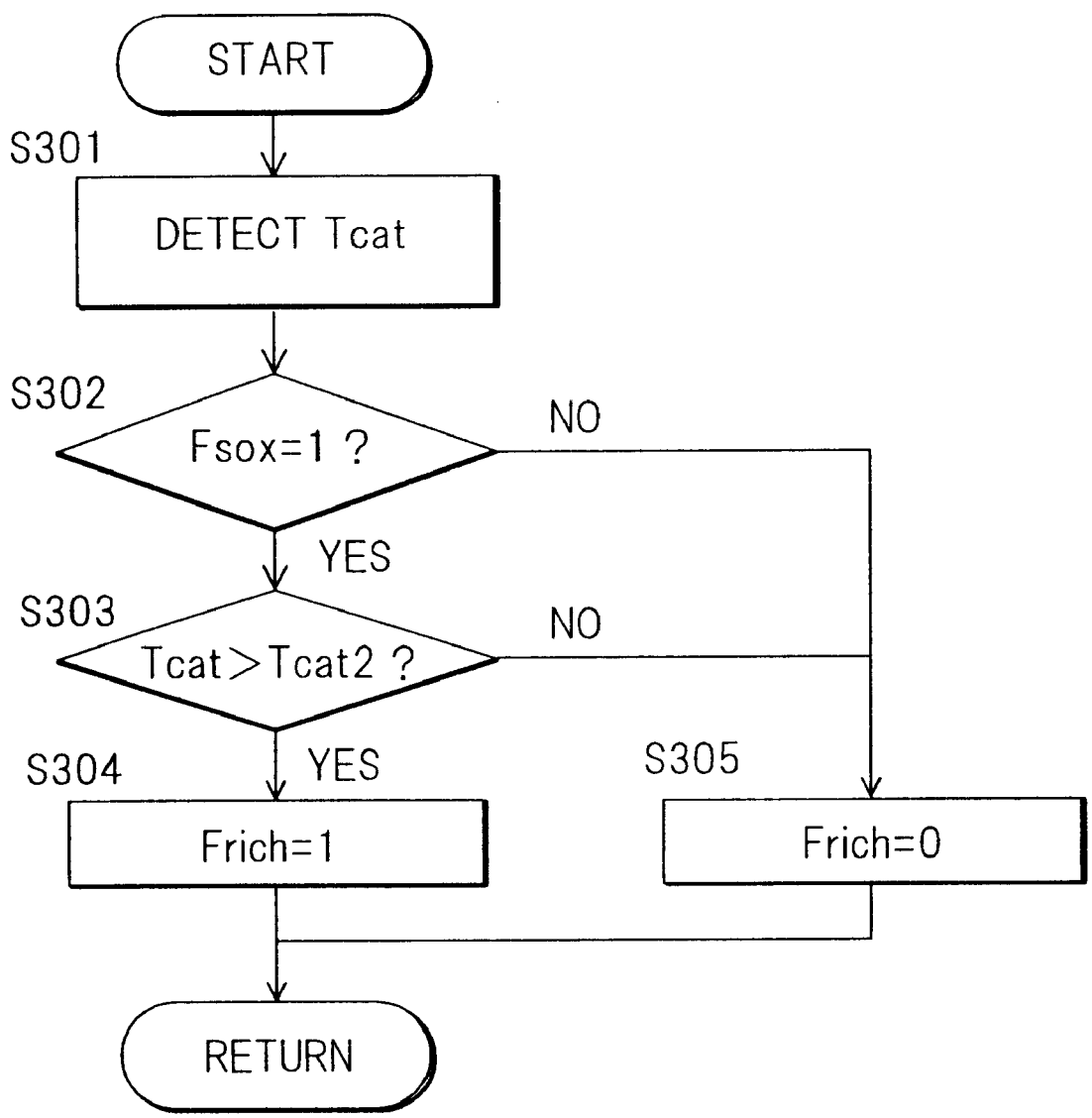
FIG. 5 shows a routine for determining rich air-fuel ratio conditions.

FIG. 5 is a routine for determining rich air-fuel ratio conditions. This routine is performed by the controller 6 at a predetermined interval, for example every 10 milliseconds.

Here, a flag Frich, which determines whether rich conditions of the air-fuel ratio are satisfied, is set based on the flag Fsox and catalyst temperature Tcat.

First, in a step S301, the output of the catalyst temperature sensor 12 is A/D converted, and the catalyst temperature Tcat is calculated. In a step S302, it is determined whether or not the conditions for discharging SOx stored in the rear three-way catalyst 9 are satisfied, based on the flag Fsox. When the SOx discharge conditions are satisfied (Fsox=1), the routine proceeds to a step S303, otherwise (Fsox=0) the routine proceeds to a step S305.

In the step S303, it is determined whether or not the catalyst temperature Tcat is higher than the SOx discharge temperature Tcat2. When the catalyst temperature Tcat is higher than the SOx discharge temperature Tcat2, the routine proceeds to a step S304. On the other hand, when the catalyst temperature Tcat is lower than the SOx discharge temperature Tcat2, the routine proceeds to the step S305.

In the step S304, the flag Frich is set to 1 which shows that rich air-fuel ratio conditions are satisfied.

In the step S305, the flag Frich is set to zero which shows that rich air-fuel ratio conditions are not satisfied.

Therefore, by performing this routine, it is determined whether rich air-fuel ratio conditions are satisfied based on the flag Fsox and the catalyst temperature Tcat. When rich air-fuel ratio conditions are satisfied, the flag Frich is set to 1, and when they are not satisfied, the flag Frich is set to zero.

Specifically, it is determined that rich air-fuel ratio conditions are satisfied when SOx discharge conditions are satisfied, and the temperature Tcat of the rear three-way catalyst 9 is higher than the SOx discharge temperature Tcat2. The flag Frich is then set to 1.

Figure 6:
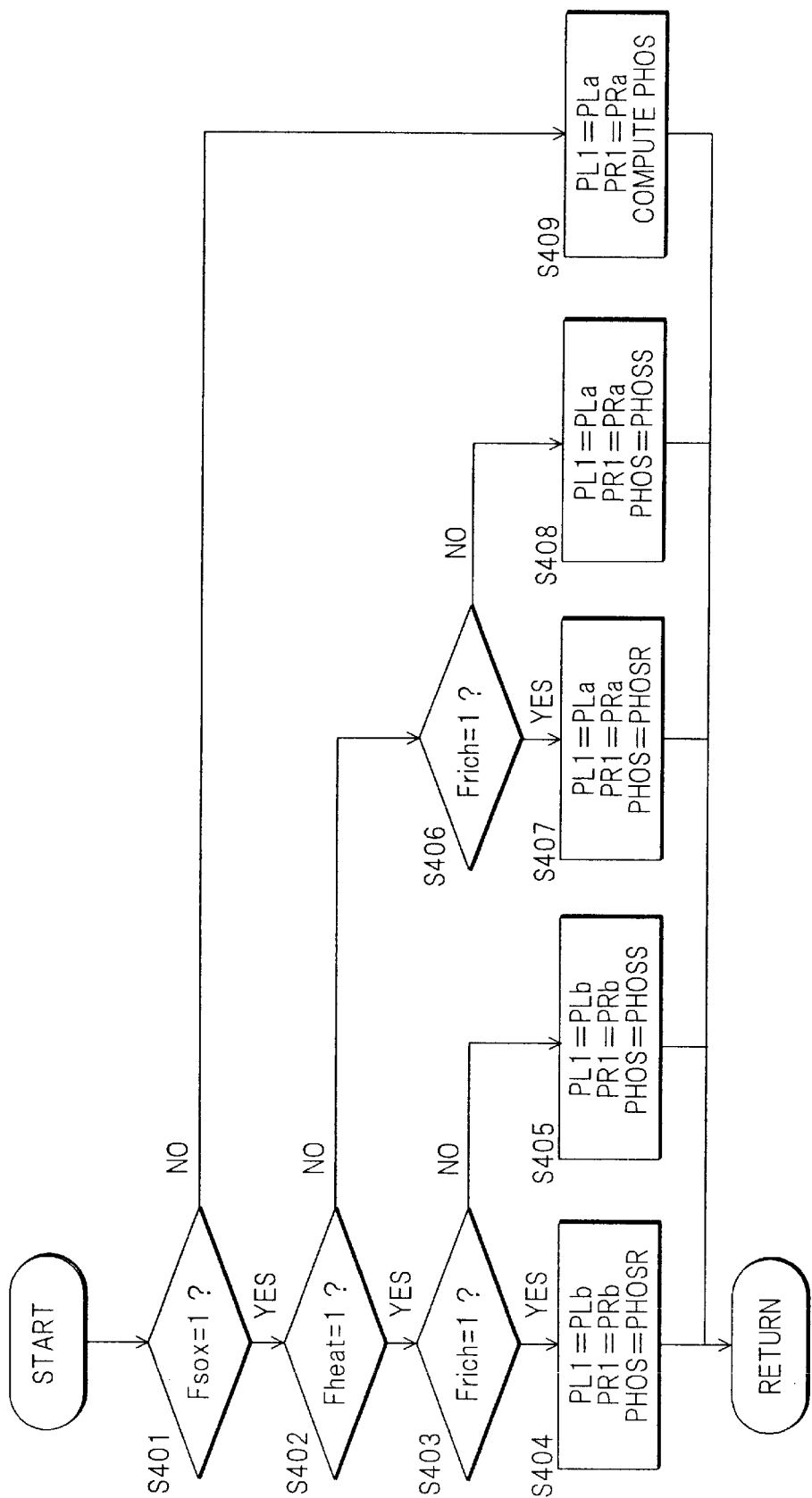
FIG. 6 shows a routine for setting an air-fuel ratio control value.

FIG. 6 is a routine for setting an air-fuel ratio control value. This routine is performed by the controller 6 at a predetermined interval, for example every 10 milliseconds.

Here, basic control parameters PL1, PR1 and a correction value PHOS are set based on the flags Fsox, Fheat and Frich.

The basic control parameters PL1, PR1 are basic control parameters of proportional control in computing a correction factor a of air-fuel ratio feedback control. Specifically, the parameter PL1 is a rich air-fuel ratio proportional gain, and the parameter PR1 is a lean air-fuel ratio proportional gain. The amplitude of air-fuel ratio fluctuation under air-fuel ratio feedback control is larger the larger the basic control parameters PL1, PR1.

The correction value PHOS is a correction value which changes the balance of rich air-fuel ratio proportional control and lean air-fuel ratio proportional control during calculation of the air-fuel ratio feedback correction coefficient α, described later. When the correction value PHOS is positive, the control median (=average air-fuel ratio of the exhaust gas flowing into the catalyst) of air-fuel ratio feedback control is rich. When the correction value PHOS is negative, the control median becomes lean.

According to this embodiment, in normal running when conditions for discharging SOx stored in the rear three-way catalyst 9 are not satisfied, dual oxygen sensor feedback control is performed which feedback controls the correction value PHOS based on the output of the rear oxygen sensor 11. On the other hand, while SOx discharge conditions are satisfied, the correction value PHOS is set by open control.

PL1, PR1 and PHOS set by this air-fuel ratio control value setting routine are used to compute the air-fuel ratio feedback correction coefficient α, described later.

First, in a step S401, it is determined whether or not SOx discharge conditions are satisfied based on the flag Fsox.

In a step S402, it is determined whether or not temperature increase conditions are satisfied based on the flag Fheat.

In steps S403 and S406, it is determined whether or not rich air-fuel ratio conditions are satisfied based on the flag Frich.

The following steps are divided depending on the flags Fsox, Fheat, Frich. These are referred to hereafter as cases [1]–[5].

[1] Fsox=1, Fheat=1, Frich=1

When SOx discharge conditions, temperature increase conditions and rich air-fuel ratio conditions are all satisfied, the routine proceeds to a step S404.

In the step S404, PL1 and PR1 are set to PLb and PRb, and PHOS is set to PHOSR.

If PL1, PR1 are set to PLb, PRb, the amplitude of the air-fuel ratio fluctuation of the exhaust gas flowing into the front three-way catalyst 8 becomes larger than the amplitude suitable for the front three-way catalyst 8, i.e., the amplitude at which the front three-way catalyst 8 can purify HC, CO and NOx well. Further, the amplitude of the air-fuel ratio fluctuation of the exhaust gas flowing into the rear three-way catalyst 9 becomes smaller than the amplitude suitable for the rear three-way catalyst 9, i.e., the amplitude at which the rear three-way catalyst 9 can purify HC, CO and NOx well.

Moreover, PLb, PRb are set so that the control median is effectively the stoichiometric air-fuel ratio when air-fuel ratio feedback control is performed only with the basic control parameters PL1, PR1 (when the correction value PHOS is not added). In general, the magnitudes of PLb and PRb are effectively equal.

PLb, PRb are respectively memorized as single fixed values or as multiple fixed values according to the engine rotation speed and load by the memory (ROM) in the controller 6.

PLb, PRb may also be calculated by applying an increase correction with a predetermined ratio and predetermined correction amount to PLa, PRa which define the magnitude of the basic control parameters of proportional control during normal running.

PLb, PRb may also be set according to the degree of deterioration of the front three-way catalyst 8. In this case, these values are memorized by the rewritable memory (RAM) in the controller 6.

On the other hand, PHOSR is a value which makes the average air-fuel ratio of the exhaust gas, rich. PHOSR is memorized by the memory (ROM) of the controller 6 as a single fixed value or as multiple fixed values according to the engine rotation speed and load.

Alternatively, the correction value PHOSR may be set according to the SOx discharge amount. In this case, the correction value PHOSR is memorized by the rewritable memory (RAM).

[2] Fsox=1, Fheat=1, Frich=0

When SOx discharge conditions and temperature increase conditions are satisfied, but rich air-fuel ratio conditions are not satisfied, the routine proceeds to a step S405.

In the step S405, the basic control parameters PL1, PR1 are set to PLb, PRb, and the correction value PHOS is set to PHOSS.

Here, PLb and PRb are the same as those set in the step S404. On the other hand, PHOSS is a value which makes the average air-fuel ratio of the exhaust gas flowing into the front three-way catalyst 8, the stoichiometric air-fuel ratio. PHOSS is memorized as a single fixed value or as multiple fixed values according to the engine rotation speed and load by the memory (ROM) in the controller 6.

PLb, PRb are set so that the control median is effectively the stoichiometric air-fuel ratio when air-fuel ratio feedback control is performed only with the basic control parameters PL1, PR1, so PHOSS may be set equal to zero.

Also, as the correction value PHOS is computed so that the air-fuel ratio of the exhaust gas is the stoichiometric air-fuel ratio during normal running using the dual oxygen sensor feedback in this embodiment, PHOSS may be set equal to the average of the correction value PHOS obtained at this time.

[3] Fsox=1, Frich=1, Fheat=0

When SOx discharge conditions and rich air-fuel ratio conditions are satisfied, but temperature increase conditions are not satisfied, the routine proceeds to a step S407.

In the step S407, the basic control parameters PL1 and PR1 are set to PLa and PRa, and the correction value PHOS is set to PHOSR.

PHOSR is the same as that set in the step S404. On the other hand, PLa, PRa are values defining the magnitude of the basic control parameters of proportional control during normal running. If the basic control parameters PL1 and PR1 are set to PLa and PRa, the amplitude of the air-fuel ratio fluctuation of the exhaust gas is set less than the amplitude suitable for the front three-way catalyst 8, i.e., the amplitude at which the front three-way catalyst 8 can purify HC, CO and NOx well.

Moreover, PLa, PRa are set so that the control median is effectively the stoichiometric air-fuel ratio when air-fuel ratio feedback control is performed only with the basic control constants PL1, PR1 (when the correction value PHOS is not added). In general, the magnitudes of PLa and PRa are made almost equal.

PLa, PRa are memorized by the memory (ROM) of the controller 6 as a single fixed value or as multiple fixed values according to the engine rotation speed and load. PLa, PRa may also be set according to the degree of deterioration of the front three-way catalyst 8, in which case they are stored in the RAM.

[4] Fsox=1, Fheat=0, Frich=0

When only SOx discharge conditions are satisfied, and temperature increase conditions and rich air-fuel ratio conditions are not satisfied, the routine proceeds to a step S408.

In the step S408, the basic control parameters PL1 and PR1 are set to PLa and PRa, and the correction value PHOS is set to PHOSS. PLa, PRa are the same as those set in the step S407, and PHOSS is the same as that set in the step S405.

[5] Fsox=0, Fheat=0, Frich=0

When none of the SOx discharge conditions, temperature increase conditions and rich air-fuel ratio conditions are satisfied, the routine proceeds to a step S409.

In the step S409, the basic control parameters PL1 and PR1 are set to PLa and PRa. The correction value PHOS is computed so that the average air-fuel ratio of the exhaust gas flowing into the rear three-way catalyst 9 is the stoichiometric air-fuel ratio based on the output of the rear oxygen sensor 11.

In an embodiment where dual oxygen sensor feedback control is not performed during normal running, the correction value PHOS may be set to PHOSS.

Although the above-mentioned routine is performed at a predetermined interval, PL1, PR1 and PHOS are only reflected in feedback control when proportional control is performed in computing the air-fuel ratio feedback correction coefficient α in the routine described below. Therefore, this routine may be performed in accordance with the timing with which proportional control is executed.

If the basic control parameters PL1 and PR1 are set to PLb and PRb and air-fuel ratio feedback control is performed, the amplitude of air-fuel ratio fluctuation will increase. The amount of HC, CO, NOx and $O_2$ ejected from the engine 1 increases, and the purification rate of the front three-way catalyst 8 declines. In other words, the HC, CO, NOx and $O_2$ passing through the front three-way catalyst 8 will increase.

Figure 7:
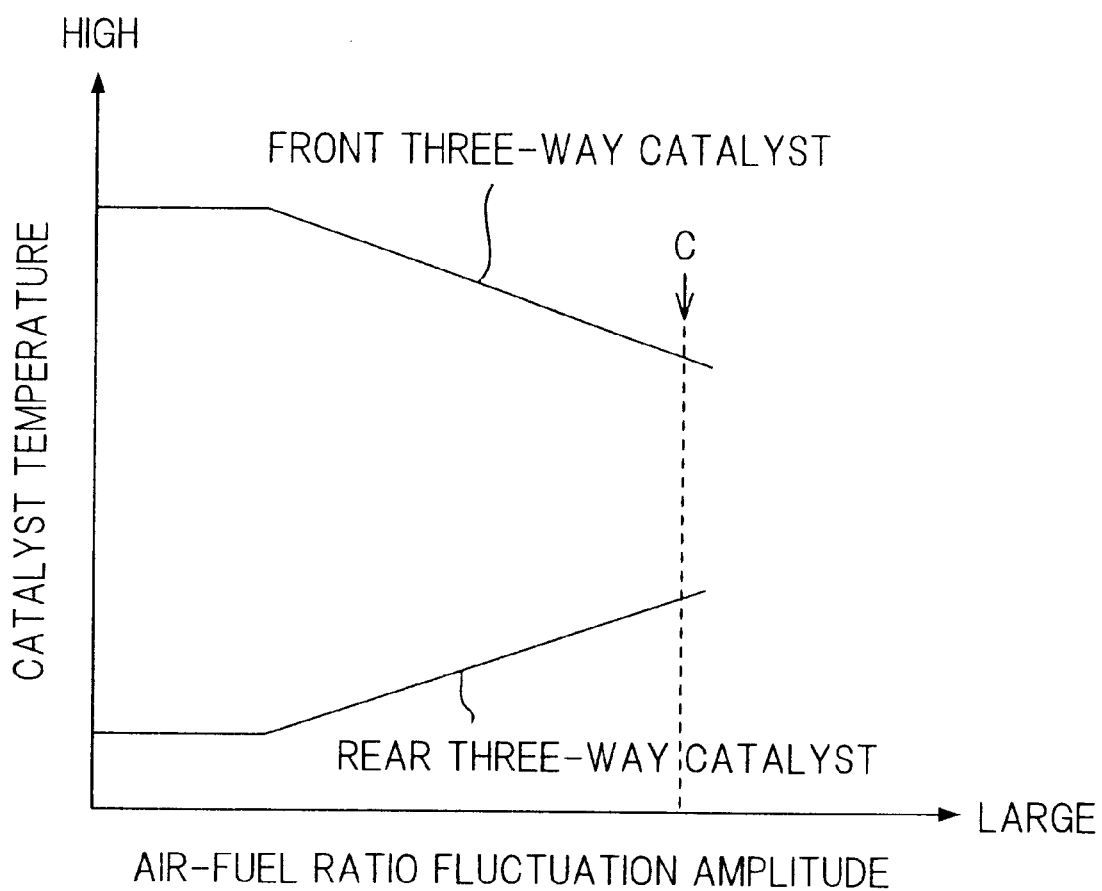
FIG. 7 is a diagram showing the relation of the amplitude of an air-fuel ratio fluctuation to a catalyst temperature.

If the amount of HC, CO, NOx and $O_2$ passing through the front three-way catalyst 8 increases, the amount of catalytic reactions in the rear three-way catalyst 9 will increase, and the temperature of the rear three-way catalyst 9 will rise due to the heat of reaction at this time. On the other hand, as catalytic reactions in the front three-way catalyst 8 do not increase, the temperature of the front three-way catalyst 8 does not rise (state of arrow C in FIG. 7).

The front three-way catalyst 8 has a lower oxygen storage capacity than the rear three-way catalyst 9, and the width of air-fuel ratio fluctuation suited to the front three-way catalyst 8 is smaller than the width of air-fuel ratio fluctuation suited to the rear three-way catalyst 9. Therefore, PLb, PRb are set to much larger values than PLa, PRa, which can supply an amount of HC, CO, NOx and $O_2$ to the rear three-way catalyst 9 that can quickly raise its temperature.

However, even when using two catalysts where the air-fuel ratio fluctuation width suitable for the front three-way catalyst 8 is an air-fuel ratio fluctuation width suitable for the rear three-way catalyst 9, considering that the air-fuel ratio fluctuation is weakened in the front three-way catalyst 8 and the exhaust pipe 7 beyond it, it is possible to set PLb, PRb to values which make the air-fuel ratio fluctuation width at the inlet of the rear three-way catalyst 9 smaller than the width suitable for the rear three-way catalyst 9, while making the air fuel ratio fluctuation width at the inlet of the front three-way catalyst 8 larger than the width suitable for the front three-way catalyst 8.

Figure 8:
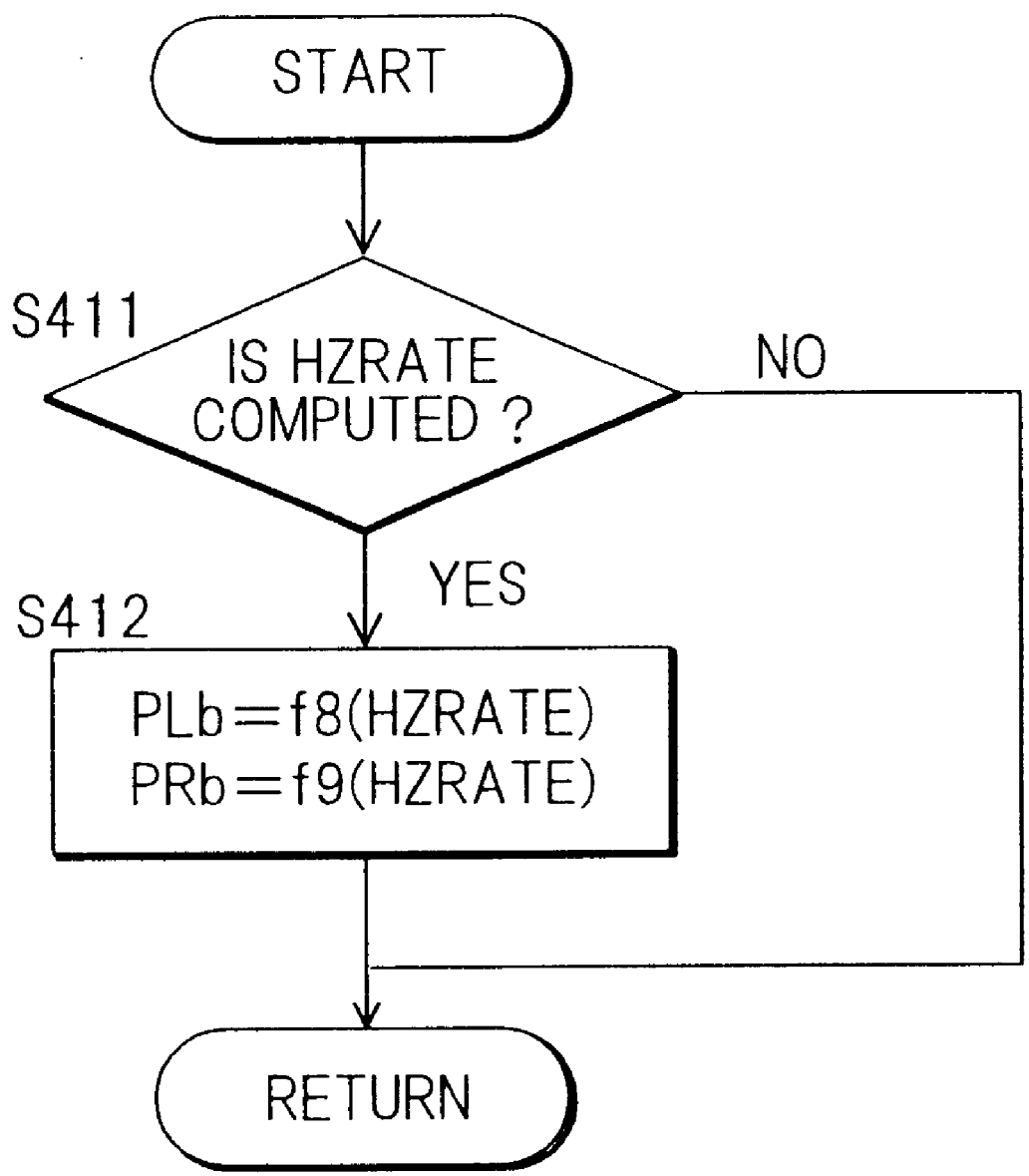
FIG. 8 shows a routine in the case of making PLb and PRb variable.

If PLb, PRb are set according to the degree of deterioration of the front three-way catalyst 8, the processing of FIG. 8 is also performed.

FIG. 8 is a routine for setting PLb and PRb according to the degree of the deterioration of the front three-way catalyst 8.

First, in a step S411, it is determined whether or not detection of the deterioration of the front three-way catalyst 8 was performed.

The deterioration of the front three-way catalyst 8 is detected under the following conditions, for example:

F/B conditions are satisfied.

The engine rotation speed and load are in a predetermined deterioration detection operating region.

The fluctuation of engine rotation speed and load is within predetermined limits.

The F/B conditions are satisfied when the following three conditions are all satisfied.

The activity of the front oxygen sensor 10 is complete.

The fuel increase amount correction coefficient COEF is 1, i.e., fuel increase amount control immediately after engine startup is complete.

The target equivalence ratio TFBYA is 1, i.e., the target air-fuel ratio is the stoichiometric air-fuel ratio.

If the number of inversions of the rear oxygen sensor 11 while the front oxygen sensor 10 performs a predetermined number of inversions, is HZRATE, the degree of deterioration of the front three-way catalyst 8 will be larger the larger is HZRATE. Here, when a new HZRATE is computed, it is determined that "deterioration detection was performed", and a step S412 is performed. As long as there is no calculation of a new HZRATE, the setting on the immediately preceding occasion is maintained.

Figure 9:
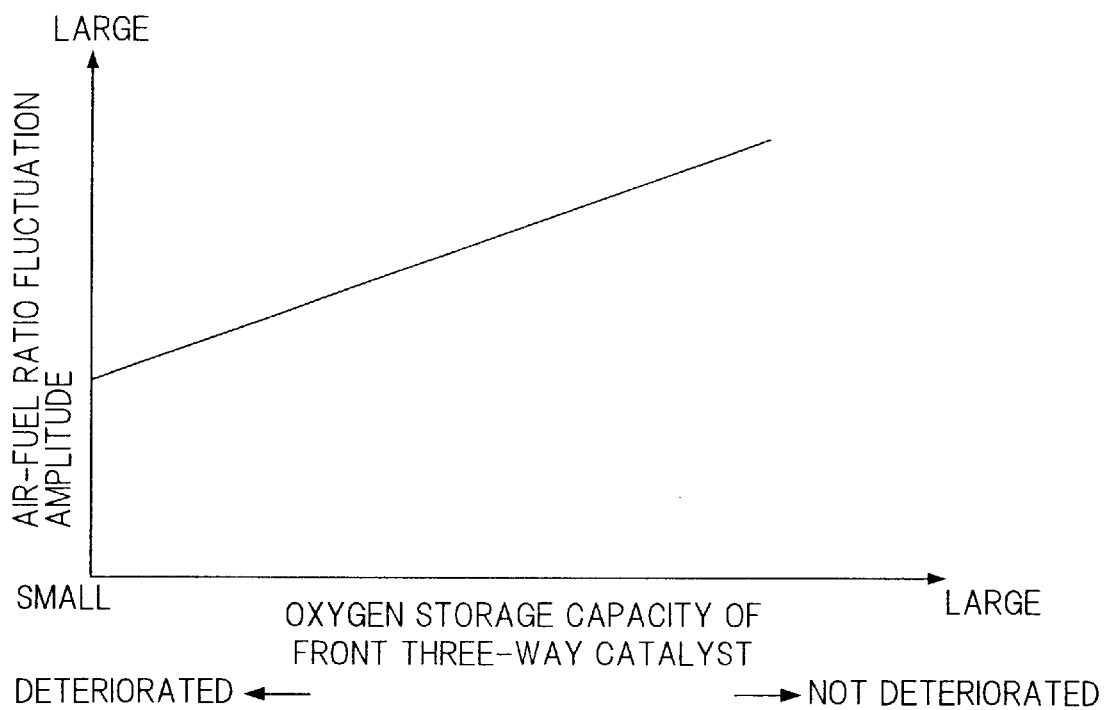
FIG. 9 is a figure showing the relation of the oxygen storage capacity of a front three-way catalyst and a required amplitude of an air-fuel ratio fluctuation.

In the step S412, PLb and PRb are computed by substituting HZRATE in functions f8 and f9. When the front three-way catalyst 8 deteriorates and its oxygen storage capacity becomes small, even if the amplitude of air-fuel ratio fluctuation is the same, the amount of HC, CO and NOx passing through the front three-way catalyst 8 will increase. In order to adjust the temperature rise characteristics of the rear three-way catalyst 9 to be of the same order, the amplitude of the air-fuel ratio fluctuation during temperature increase control must be reduced as shown in FIG. 9.

The functions f8 and f9 are therefore defined so that the magnitudes of PLb and PRb are smaller the larger the degree of deterioration HZRATE of the front three-way catalyst 8.

PLb, PRb are set to values (f8(0), f9(0)) corresponding to catalysts without deterioration until the first detection of catalyst deterioration is performed.

Figure 10:
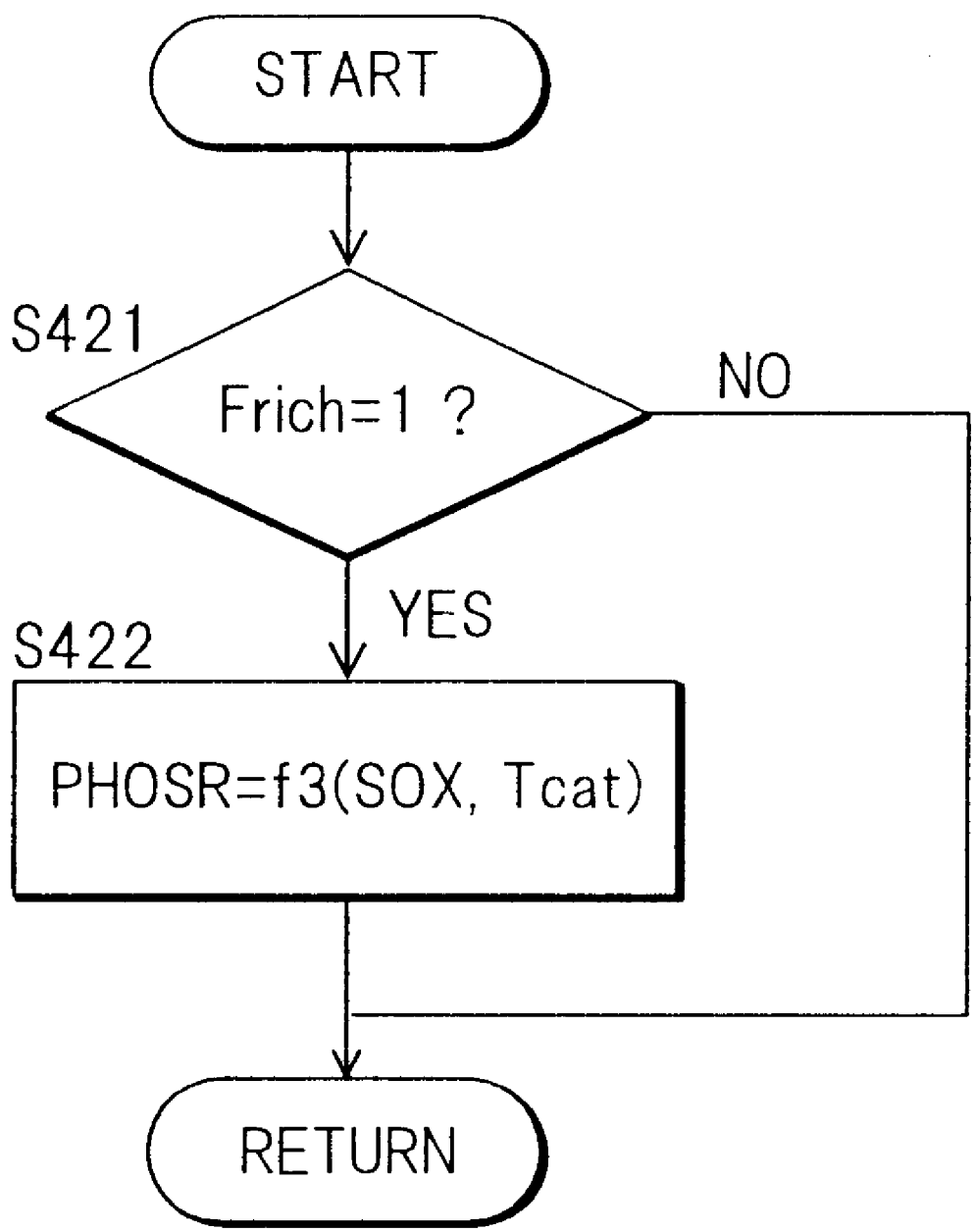
FIG. 10 shows a routine when PHOSR is made variable.

When PHOSR is set according to the SOx discharge amount, the processing shown in FIG. 10 is performed.

FIG. 10 is a routine for setting PHOSR according to the SOx discharge amount.

First, in a step S421, it is determined whether or not rich air-fuel ratio conditions are satisfied based on the flag Frich. When rich air-fuel ratio conditions are satisfied (Frich=1), the routine proceeds to a step S422, and in other cases (Frich=0), this routine is terminated.

In a step S422, PHOSR is computed by substituting the SOx storage amount SOX and catalyst temperature Tcat of the rear three-way catalyst 9 in the function f3.

The function f3 is defined so that the richness due to PHOSR has the following characteristics.

The richness decreases as the SOx storage amount SOX of the rear three-way catalyst 9 decreases, and is zero when the SOx storage amount SOX is zero.

The richness decreases as the catalyst temperature Tcat of the rear three-way catalyst 9 decreases, and is zero below the SOx discharge temperature Tcat2.

Figure 11:
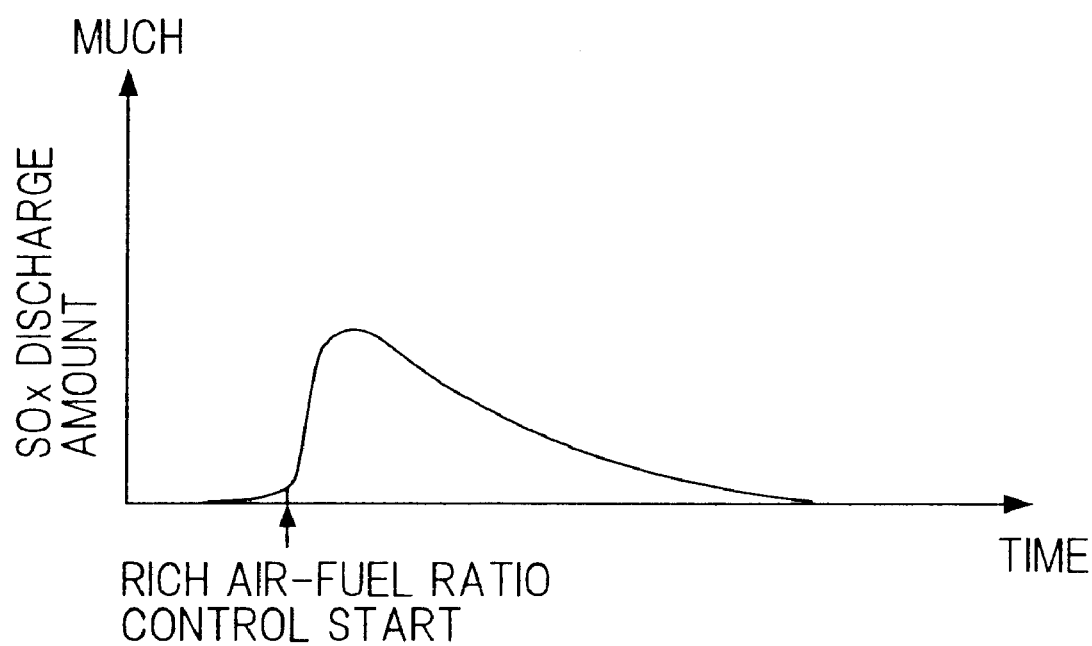
FIG. 11 is a diagram showing the relation of elapsed time after rich air-fuel ratio control is started, and an SOx discharge amount.

Therefore, due to the processing of this routine, PHOSR is set according to the SOx discharge amount. The SOx discharge amount varies as shown in FIG. 11 according to the time after starting rich air-fuel ratio control, and since the SOx storage amount decreases with the elapsed time, the richness decreases the longer the elapsed time after starting rich air-fuel ratio control.

Figure 12:
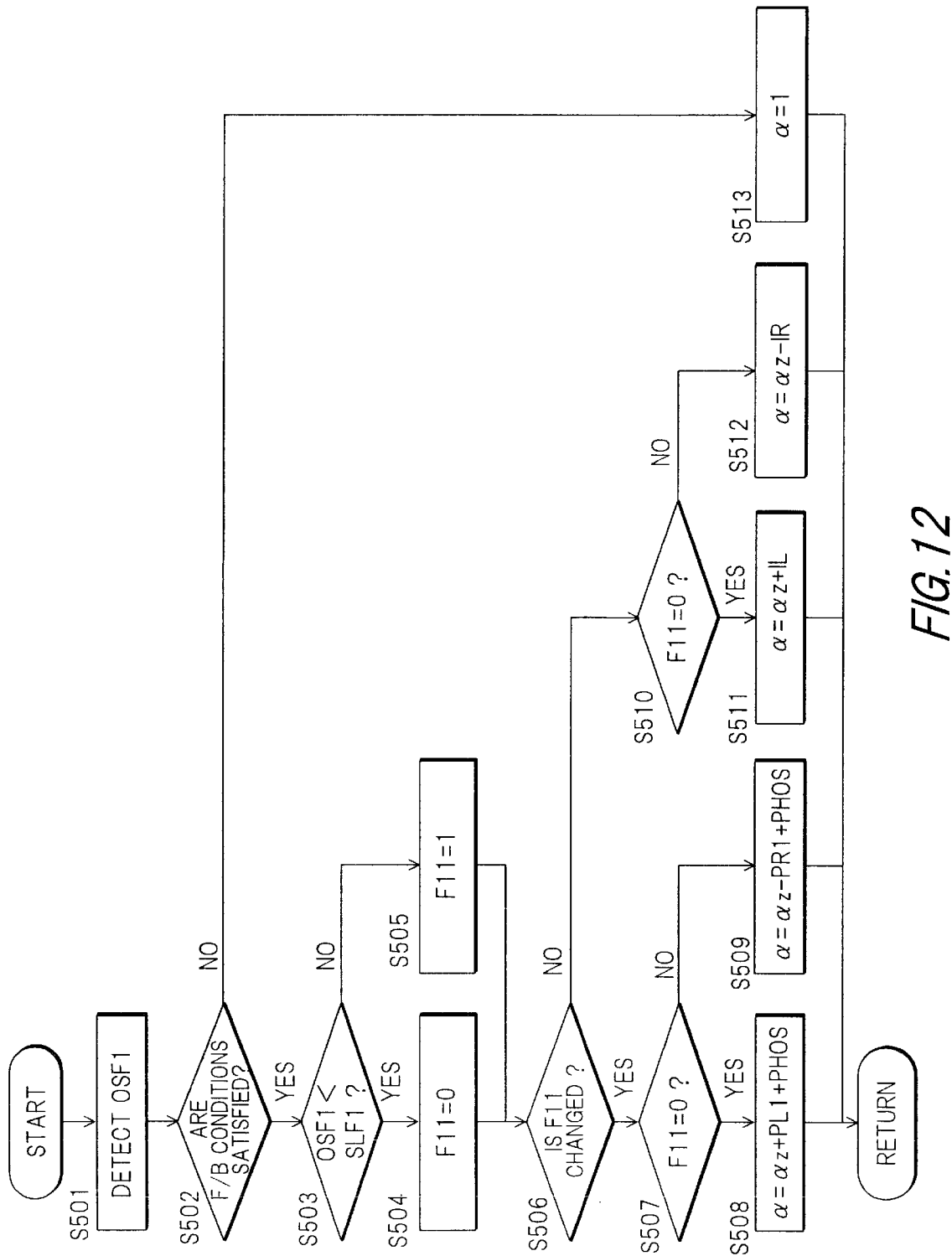
FIG. 12 shows a routine for computing an air-fuel ratio feedback correction coefficient.

FIG. 12 is a routine for computing the air-fuel ratio feedback correction coefficient α. This routine is performed by the controller 6 at a predetermined interval, for example, 10 milliseconds.

Here, the correction coefficient α in air-fuel ratio feedback control is computed.

First, in a step S501, the output of the front oxygen sensor 10 is A/D converted, and an oxygen concentration signal OSF1 is calculated.

In a step S502, it is determined whether or not F/B conditions are satisfied.

If F/B conditions are satisfied, the routine proceeds to a step S503, otherwise the routine proceeds to a step S513.

In the steps S503 to S512, the air-fuel ratio feed back control correction coefficient α is computed by proportional control using the basic control constants (rich air-fuel ratio proportional gain PL1, lean air-fuel ratio proportional gain PR1) and the correction value PHOS, and integral control using the basic control constants (rich air-fuel ratio integral gain IL, lean air-fuel ratio integral gain IR) based on the comparison result of the oxygen concentration signal OSF1 and a threshold limit value SLF1. The subscript z attached to the correction coefficient α in the flowchart denotes the value computed on the immediately preceding occasion (value computed 10 milliseconds ago).

On the other hand, in a step S523, the correction coefficient α is set to 1.

The correction coefficient α computed by this routine is used in a routine for computing the fuel injection timing and fuel injection amount, described later.

Figure 13:
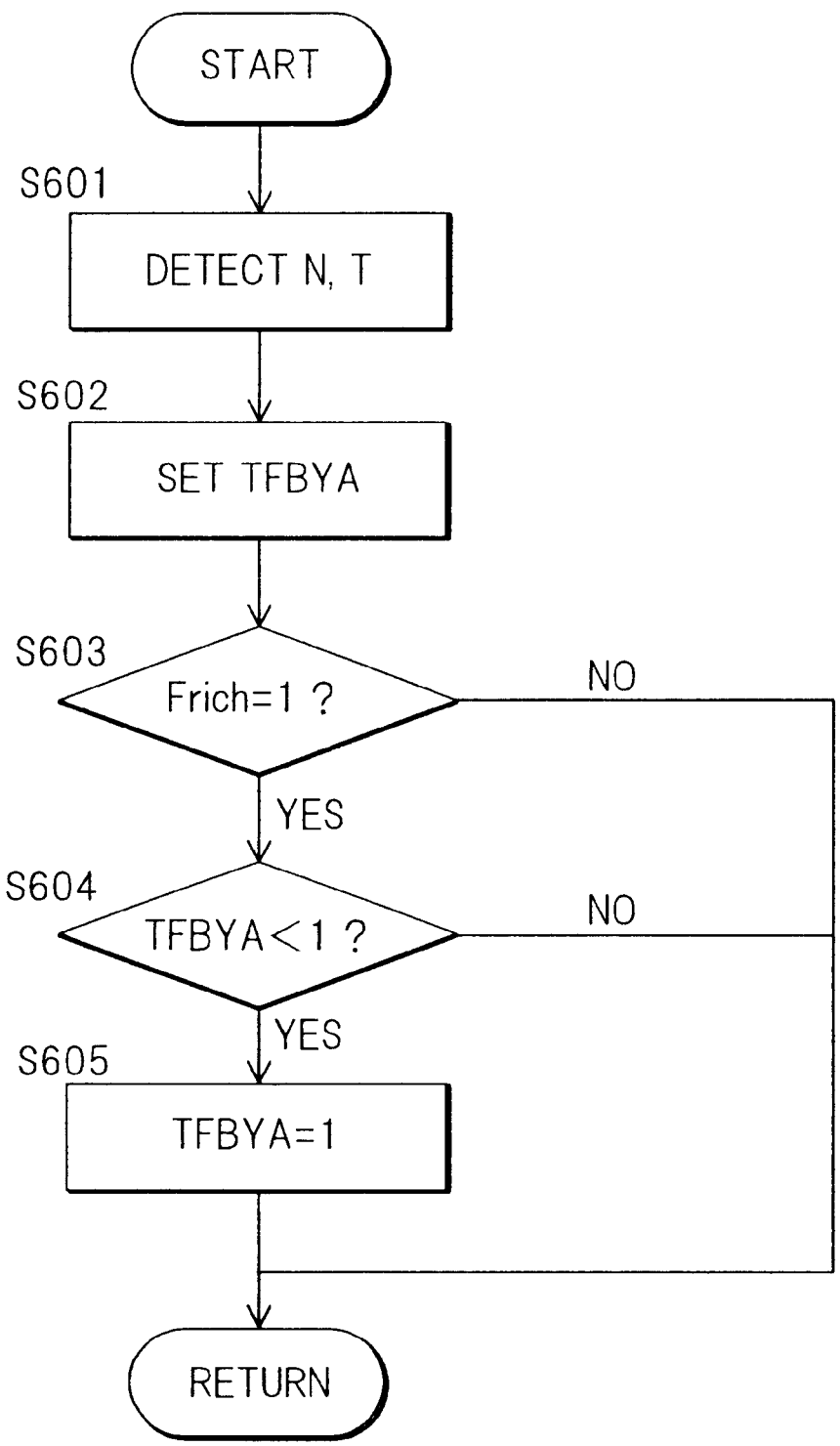
FIG. 13 shows a routine for setting the target air-fuel ratio.

FIG. 13 is a routine for setting a target air-fuel ratio. This routine is performed by the controller 6 at a predetermined interval, for example 10 milliseconds.

Here, the target air-fuel ratio (target equivalence ratio) is set according to running conditions and whether rich air-fuel ratio conditions are satisfied.

First, in a step S601, the engine rotation speed N is calculated based on the recurrence interval of a predetermined signal of the crank angle sensor 14. The engine load T is also calculated based on the output of the accelerator position sensor 15.

In a step S602, the target equivalence ratio TFBYA is set according to the engine rotation speed N and engine load T by referring to a target equivalence ratio setting map shown in FIG. 4. Here, the target equivalence ratio TFBYA is the ratio of the stoichiometric air-fuel ratio and target air-fuel ratio (stoichiometric air-fuel ratio/target air-fuel ratio). When TFBYA is 1, the air fuel ratio is the stoichiometric air fuel ratio, when it is greater than 1, the air fuel ratio is rich, and when it is less than 1, the air fuel ratio is lean.

In a step S603, it is determined whether or not rich air-fuel ratio conditions are satisfied based on the flag Frich. When rich air-fuel ratio conditions are satisfied (Frich=1), the routine proceeds to a step S604.

In the step S604, it is determined whether or not TFBYA which was set in the step S602, is smaller than 1. When TFBYA is smaller than 1, the routine proceeds to a step S605, and in the step S605, TFBYA is set to 1.

Hence, due to the processing of this routine, the target equivalence ratio TFBYA is set according to running conditions, but if rich air-fuel ratio conditions are satisfied, the target equivalence ratio TFBYA is set to 1 even if running conditions are in the lean air-fuel ratio operating region.

That is, once SOx discharge control is started, rich air-fuel ratio control will be continued while the catalyst temperature is above the SOx discharge temperature and SOx discharge is possible.

The target equivalence ratio TFBYA set here is used to compute fuel injection amount in a fuel injection timing and fuel injection amount setting routine described later, and also in various other routines as a value representing the air-fuel ratio.

Figure 14:
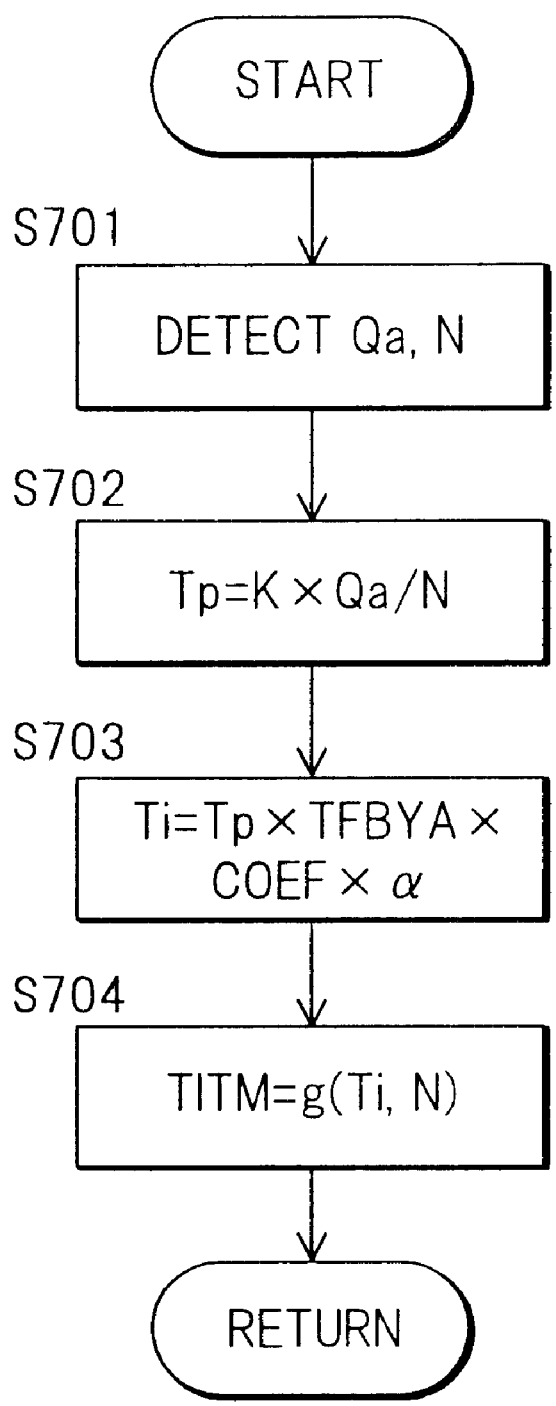
FIG. 14 shows a routine for setting a fuel injection timing and an injection amount.

FIG. 14 is a routine for setting the fuel injection timing and fuel injection amount. This routine is performed at a predetermined interval, for example 10 milliseconds.

Here, a fuel injection amount Ti and fuel injection timing TITM are computed so that the target equivalence ratio TFBYA set in the above routine for setting the target air-fuel ratio, is realized.

First, in a step S701, an intake air amount Qa is calculated based on the output of the air flow meter 3. The engine rotation speed N is calculated based on the recurrence interval of a predetermined signal of the crank angle sensor 14.

In a step S702, a basic fuel injection amount Tp, i.e., an amount equivalence to the stoichiometric air-fuel ratio, is computed by the equation:

$$Tp = K \times Qa/N \tag{3}$$

based on the intake air amount Qa and engine rotation speed N. K is a predetermined coefficient.

In a step S703, the basic fuel injection amount Tp is corrected by the target equivalence ratio TFBYA, fuel increase amount correction coefficient COEF and air-fuel ratio feedback correction coefficient α. The fuel injection amount Ti is computed by the equation:

$$Ti = Tp \times TFBYA \times COEF \times \alpha \tag{4}$$

Here, the fuel increase amount correction coefficient COEF collectively represents a fuel increase amount correction coefficient after startup and a water temperature increase amount correction coefficient. When the engine 1 is cold, COEF is larger than 1, and when warm-up of the engine 1 is complete, COEF is 1.

In a step S704, a fuel injection timing TITM is computed based on the fuel injection amount Ti computed in the step S703, and the engine rotation speed N.

The computed fuel injection amount Ti and fuel injection timing TITM are recorded by the memory in the controller 6, and read and used by a fuel injection routine, not shown, which is performed in synchronism with the rotation of the engine 1. In the fuel injection routine, a signal is for example output to the injector 5 so that a fuel amount obtained by adding an ineffectual injection amount Ts to the fuel injection amount Ti is injected at a crank angle determined by the fuel injection timing TITM.

In this embodiment, stratified charge combustion is performed when running at a lean air-fuel ratio, and uniform charge combustion is performed when running at the stoichiometric air-fuel ratio or a rich air-fuel ratio. For this reason, when running at a lean air-fuel ratio, the fuel injection timing TITM is set in the compression stroke. When running at the stoichiometric air-fuel ratio or a rich air-fuel ratio, the fuel injection timing TITM is set in the intake stroke.

Figure 15:
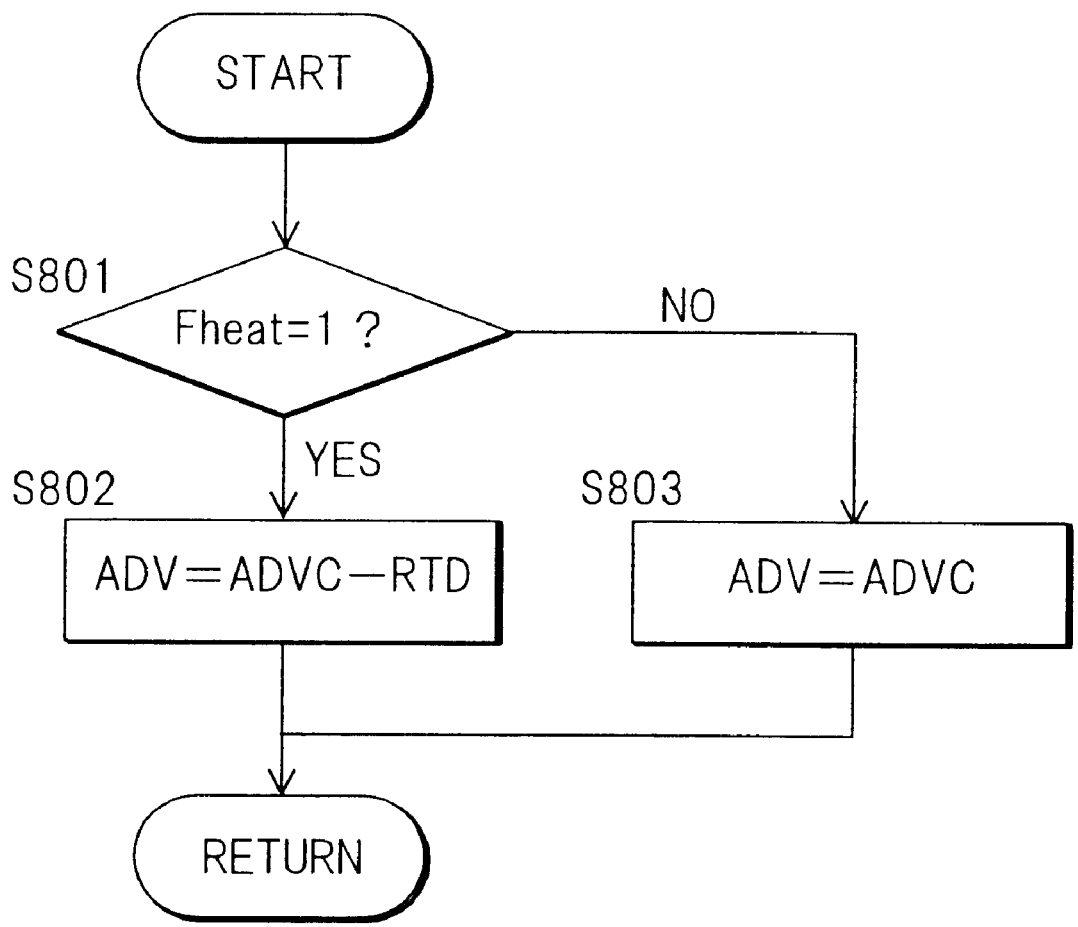
FIG. 15 shows a routine for setting an ignition timing.

FIG. 15 is a routine for setting an ignition timing ADV. This routine is performed by the controller 6 at a predetermined interval, for example 10 milliseconds.

Here, the ignition timing ADV is set based on the flag Fheat which is set by the routine for determining the above-mentioned temperature increase conditions.

First, in a step S801, it is determined whether or not the temperature increase conditions in the rear three-way catalyst 9 are satisfied based on the flag Fheat. When temperature increase conditions are satisfied (Fheat=1), the routine proceeds to a step S802, and when they are not satisfied (Fheat=0), the routine proceeds to a step S803.

Figure 16:
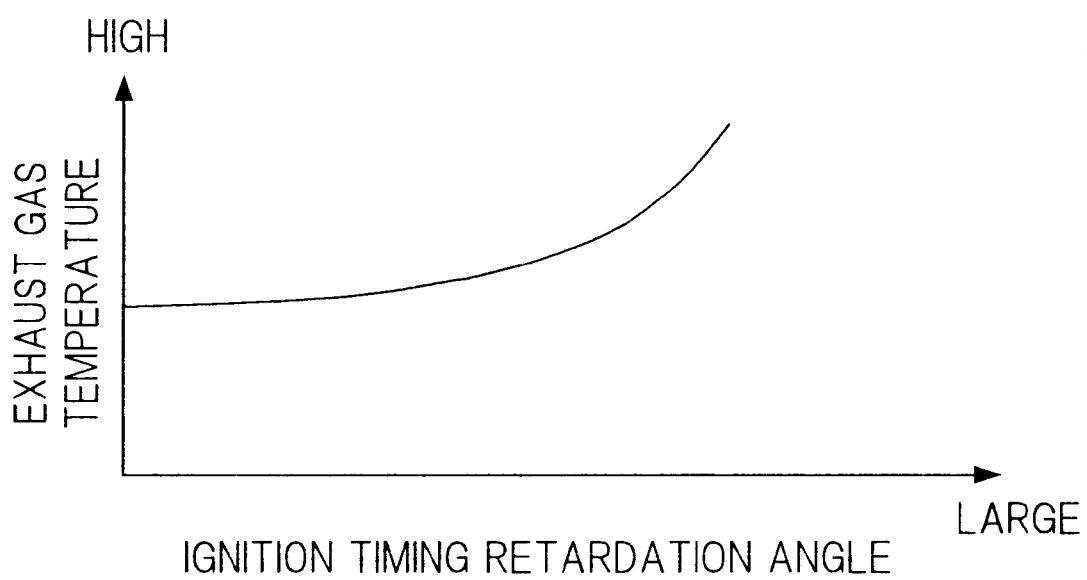
FIG. 16 is a figure showing the relation of a retardation angle amount of the ignition timing, and an exhaust gas temperature.

In the step S802, the ignition timing ADV is computed by deducting a predetermined retardation correction value RTD from an ignition timing ADVC set previously according to running conditions (engine rotation speed N, engine load T). The ignition timing ADVC is set to, for example, a timing at which the output of the engine is greatest in a region where knocking does not occur. If the ignition timing is retarded from ADVC, combustion will be retarded and the exhaust gas temperature will rise. The relation of retardation angle amount and exhaust gas temperature is shown in FIG. 16. The exhaust gas temperature rises the larger the retardation angle.

In a step S803 to which the routine proceeded if temperature increase conditions are not satisfied, the ignition timing ADV is set to ADVC.

Hence, by performing the processing of this routine, it is determined whether or not the conditions for increasing the temperature of the rear three-way catalyst 9 are satisfied based on the flag Fheat from the temperature increase condition determining routine. When the temperature increase conditions are satisfied, the ignition timing ADV is retarded by the predetermined amount RTD in order to increase the temperature. An ignition signal is then output to an ignition plug 19 in an ignition control routine, not shown, based on this ignition timing ADV.

Figure 17:
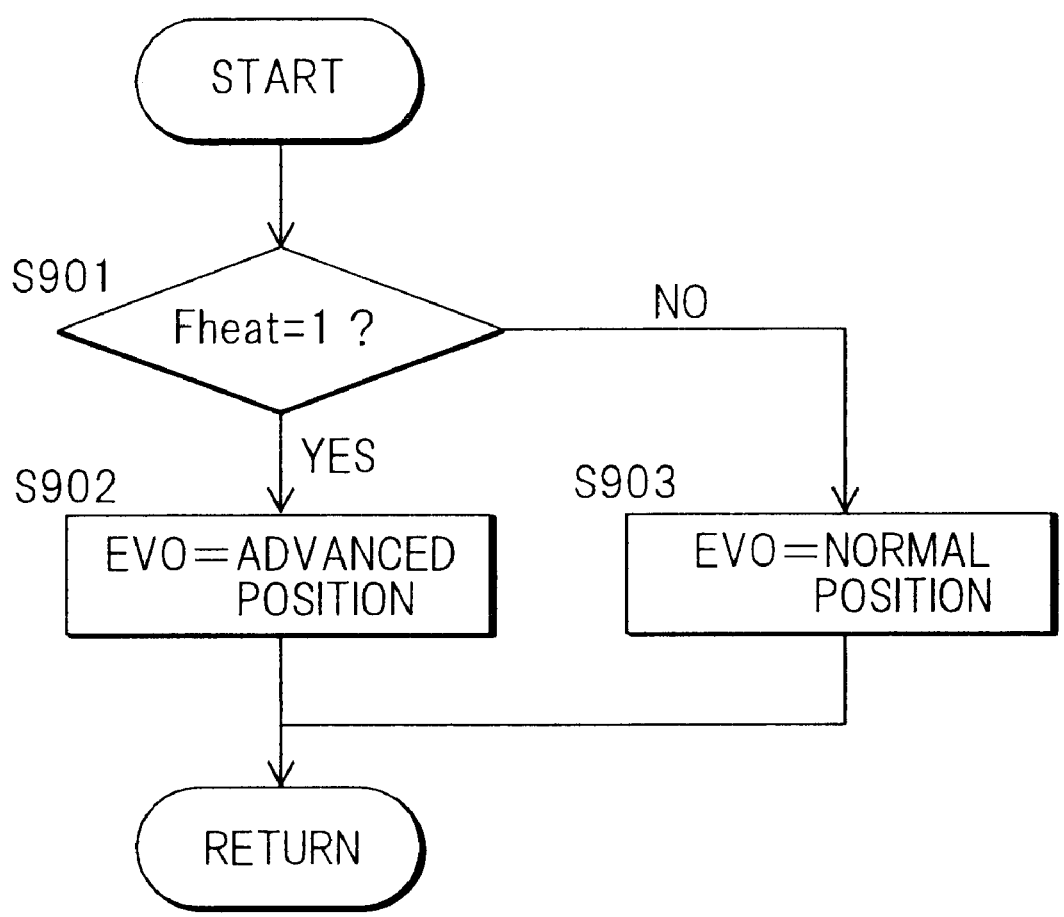
FIG. 17 shows a routine for setting an exhaust valve open timing.

FIG. 17 is a routine for setting an exhaust valve open timing EVO. This routine is performed by the controller 6 at a predetermined interval, for example 10 milliseconds.

Here, the open timing EVO of the exhaust valve is set based on the flag Fheat set by the routine for determining the temperature increase conditions.

First, in a step S901, it is determined whether or not temperature increase conditions of the rear three-way catalyst 9 are satisfied based on the flag Fheat. When temperature increase conditions are satisfied (Fheat=1), the routine proceeds to a step S902, and when they are not satisfied (Fheat=0), the routine proceeds to a step S903.

In the step S902, an exhaust valve open timing EVO is set to a more advanced position than for normal running. If the exhaust valve open timing EVO is advanced, gas at the end of the expansion stroke will flow into the exhaust pipe 7, so the exhaust gas temperature rises.

Figure 18:
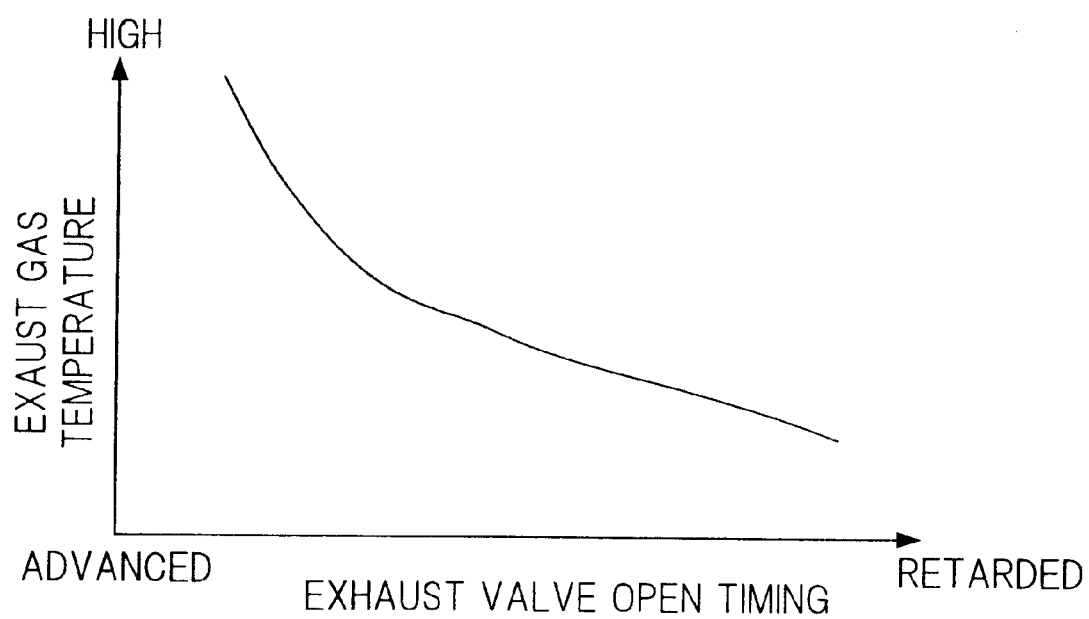
FIG. 18 is a figure showing the relation of the exhaust valve open timing and the exhaust gas temperature.

The relation of the exhaust valve open timing EVO and exhaust gas temperature is shown in FIG. 18. The exhaust gas temperature rises the larger the advance angle of the exhaust valve open timing EVO.

On the other hand, if temperature increase conditions in the rear three-way catalyst 9 are not satisfied (Fheat=0), the routine proceeds to the step S903 and the exhaust valve open timing EVO is set to a position for normal running.

Therefore, by performing the processing of this routine, it is determined whether temperature rise conditions in the rear three-way catalyst 9 are satisfied based on the flag Fheat. When temperature rise conditions are satisfied, the exhaust valve open timing is advanced, and the exhaust gas temperature is raised.

A drive signal is then output to a variable valve mechanism of the engine 1 by a valve control routine, not shown, so that the exhaust valve open timing is the exhaust valve open timing EVO.

Next, the case will be described where the above controls are performed, and the exhaust emission control device performs SOx discharge control of the rear three-way catalyst 9.

In this device, when the vehicle is running at the stoichiometric air-fuel ratio, CO, HC and NOx which are contained in the exhaust gas from the engine 1, are mostly reduced by the front three-way catalyst 8. The NOx which could not be completely reduced by the front three-way catalyst 8 during lean air-fuel ratio operation, is trapped and reduced by the rear three-way catalyst 9 which has an NOx storage capacity. SOx in the exhaust gas is also trapped in the rear three-way catalyst.

However, if the SOx amount stored in the rear three-way catalyst 9 increases, the NOx storage capacity of the rear three-way catalyst 9 will decline due to the stored SOx.

Hence, the controller 6 determines whether the conditions are satisfied for discharging SOx stored in the rear three-way catalyst 9, and when SOx discharge conditions are satisfied, SOx discharge control of the rear three-way catalyst 9 is performed.

Specifically, the amplitude of the air-fuel ratio fluctuation of the exhaust gas flowing into the front three-way catalyst 8 is increased by increasing the gain of air-fuel ratio feedback control, and the amount of CO, HC, NOx and $O_2$ passing through the front three-way catalyst 8 and flowing into the rear three-way catalyst 9 is increased.

As a result, the temperature of the rear three-way catalyst 9 rises due to the heat of reaction when these gases react on the rear three-way catalyst 9, and the stored SOx is discharged.

As CO, HC, NOx and $O_2$ pass through the front three-way catalyst 8, temperature rise of the front three-way catalyst 8 is suppressed.

If the degree of deterioration of the front three-way catalyst 8 becomes large, the amount of HC, CO, NOx and $O_2$ passing through the front three-way catalyst 8 and flowing into the rear three-way catalyst 9 will increase, even for the same air-fuel ratio fluctuation. The amplitude of the air-fuel ratio fluctuation is adjusted according to the degree of deterioration of the front three-way catalyst 8, so the temperature rise characteristics of the rear three-way catalyst 9 are maintained at about the same level.

In order that CO, HC and NOx are made to react on the rear three-way catalyst 9 with maximum efficiency and the temperature rise effect of the rear three-way catalyst 9 is enhanced, the median of the air-fuel ratio of the exhaust gas flowing into the rear three-way catalyst 9 is feedback controlled to the stoichiometric air-fuel ratio.

To further enhance the temperature rise effect of the rear three-way catalyst 9, the ignition timing of the engine 1 is retarded and the open timing of the exhaust valve is advanced to increase the exhaust gas temperature.

After sufficiently raising the temperature of the rear three-way catalyst 9, rich air-fuel ratio control is performed, and the discharged SOx is reduced. The amount of discharged SOx varies according to the amount of SOx stored in the rear three-way catalyst, but the richness is adjusted accordingly, so the discharged SOx is reduced efficiently.

Figure 19:
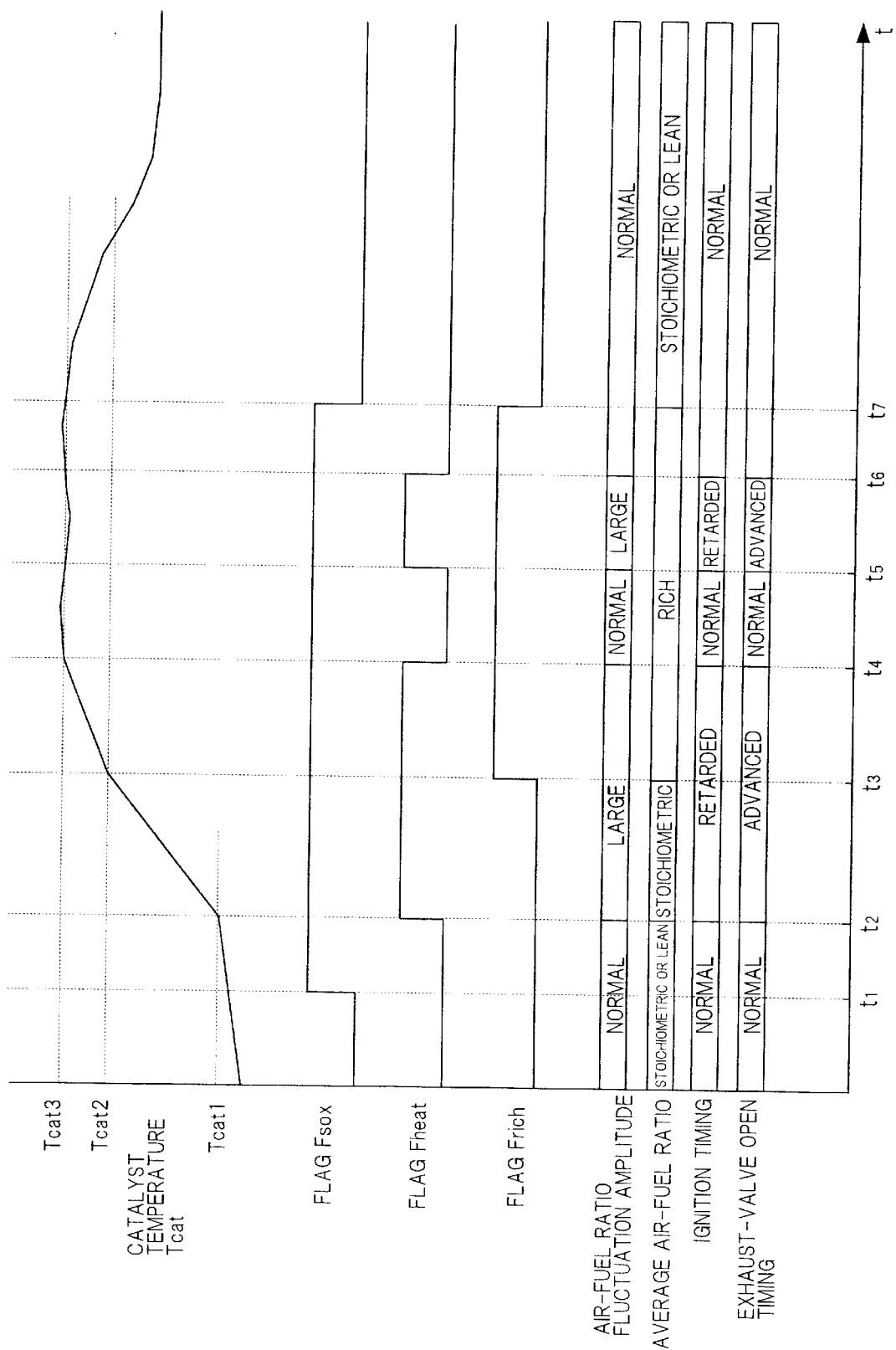
FIG. 19 is a timing chart at the time of SOx discharge control.

The case where SOx discharge control is performed will now be described referring to the time chart of FIG. 19.

Here, in order to simplify the description, it will be assumed that the running conditions are always in the region A.

First, at a time t1, the SOx amount stored in the rear three-way catalyst 9 exceeds a predetermined amount, and SOx discharge conditions are satisfied (Fsox=1).

However, as the temperature Tcat of the rear three-way catalyst 9 is still low at this time, normal control is usually performed. When running at the stoichiometric air-fuel ratio operation during normal control, the amplitude of the air-fuel ratio fluctuation under air-fuel ratio feedback control is of the usual magnitude.

When the temperature of the rear three-way catalyst 9 reaches a predetermined value Tcat1 at a time t2, temperature increase conditions in the rear three-way catalyst 9 are satisfied, the basic control constants PL1 and PR1 are set to PLb and PRb, and the amplitude of the air-fuel ratio fluctuation under air-fuel ratio feedback control increases.

The correction value PHOS is also set to PHOSS, and the median of air-fuel ratio feedback control (=average air-fuel ratio of the exhaust gas flowing into the front three-way catalyst 8 and rear three-way catalyst 9) is effectively controlled to the stoichiometric air-fuel ratio.

Due to the magnitude of the amplitude of the air-fuel ratio fluctuation, the purification rate of the front three-way catalyst 8 decreases, and the amount of HC, CO, NOx and $O_2$ passing through the front three-way catalyst 8 and flowing into the rear three-way catalyst 9, increases. Further, the reaction efficiency on the rear three-way catalyst 9 is maximized by controlling the air-fuel ratio to the stoichiometric air-fuel ratio in this way, and the temperature rise effect of the rear three-way catalyst 9 is enhanced.

Retardation of ignition timing and advance of exhaust valve open timing are performed simultaneously. Due to this, the exhaust gas temperature rises, and the temperature rise effect of the rear three-way catalyst 9 is further enhanced.

When the temperature of the rear three-way catalyst 9 reaches the SOx discharge temperature Tcat2 at a time t3, rich air-fuel ratio conditions are satisfied, the correction value PHOS is set to PHOSR, and the average air-fuel ratio of the exhaust gas flowing into the front three-way catalyst 8 and the rear three-way catalyst 9 is controlled to rich. As a result, SOx discharge from the rear three-way catalyst 9 is promoted, and the discharged SOx is reduced by unburnt fuel.

Although the temperature rise effect is slightly less when the air-fuel ratio flowing into the rear three-way catalyst 9 is rich, the catalyst temperature Tcat has already reached the SOx discharge temperature Tcat2 so there is no problem. Rather, the temperature rises more gradually, so deterioration of the rear three-way catalyst 9 is suppressed.

When the catalyst temperature Tcat reaches Tcat3 at a time t4, the basic control constants PL1 and PR1 are set to PLa and PRa to prevent deterioration of the rear three-way catalyst 9, the amplitude of the air-fuel ratio fluctuation under air-fuel ratio feedback control returns to the usual magnitude, and the catalyst temperature of the rear three-way catalyst 9 is prevented from rising excessively.

Further, the ignition timing and exhaust valve open timing also return to their usual timings, and temperature rise of the rear three-way catalyst 9 is suppressed. It may be noted that, as the correction value PHOS is set to PHOSR, the exhaust gas flowing into the front three-way catalyst 8 and the rear three-way catalyst 9 is still rich.

If the catalyst temperature Tcat becomes lower than Tcat3 at a time t5, temperature rise conditions are again satisfied, so the air-fuel ratio fluctuation is increased, the ignition timing is retarded, the exhaust valve open timing is advanced, and temperature increase of the rear three-way catalyst 9 is performed.

Also, the average air-fuel ratio of the exhaust gas flowing into the front three-way catalyst 8 and the rear three-way catalyst 9 is controlled to rich, and discharged SOx is reduced.

If the catalyst temperature Tcat reaches Tcat3 again at a time t6, the flag Fheat becomes zero, the amplitude of air-fuel ratio fluctuation under air-fuel ratio feedback control, the ignition timing and exhaust valve open timing again return to their usual magnitudes, and temperature rise of the rear three-way catalyst 9 is suppressed.

If it is determined at a time t7 that most of the SOx stored in the rear three-way catalyst 9 has been discharged and SOx discharge conditions are not satisfied, rich air-fuel ratio conditions are also not satisfied, so the average air-fuel ratio is returned to the stoichiometric air-fuel ratio and SOx discharge control is terminated.

Next, a second embodiment will be described.

The second embodiment differs from the first embodiment in the routine for determining SOx discharge conditions. SOx discharge conditions are determined based on the output of an NOx sensor 18 provided behind the rear three-way catalyst 9.

Figure 20:
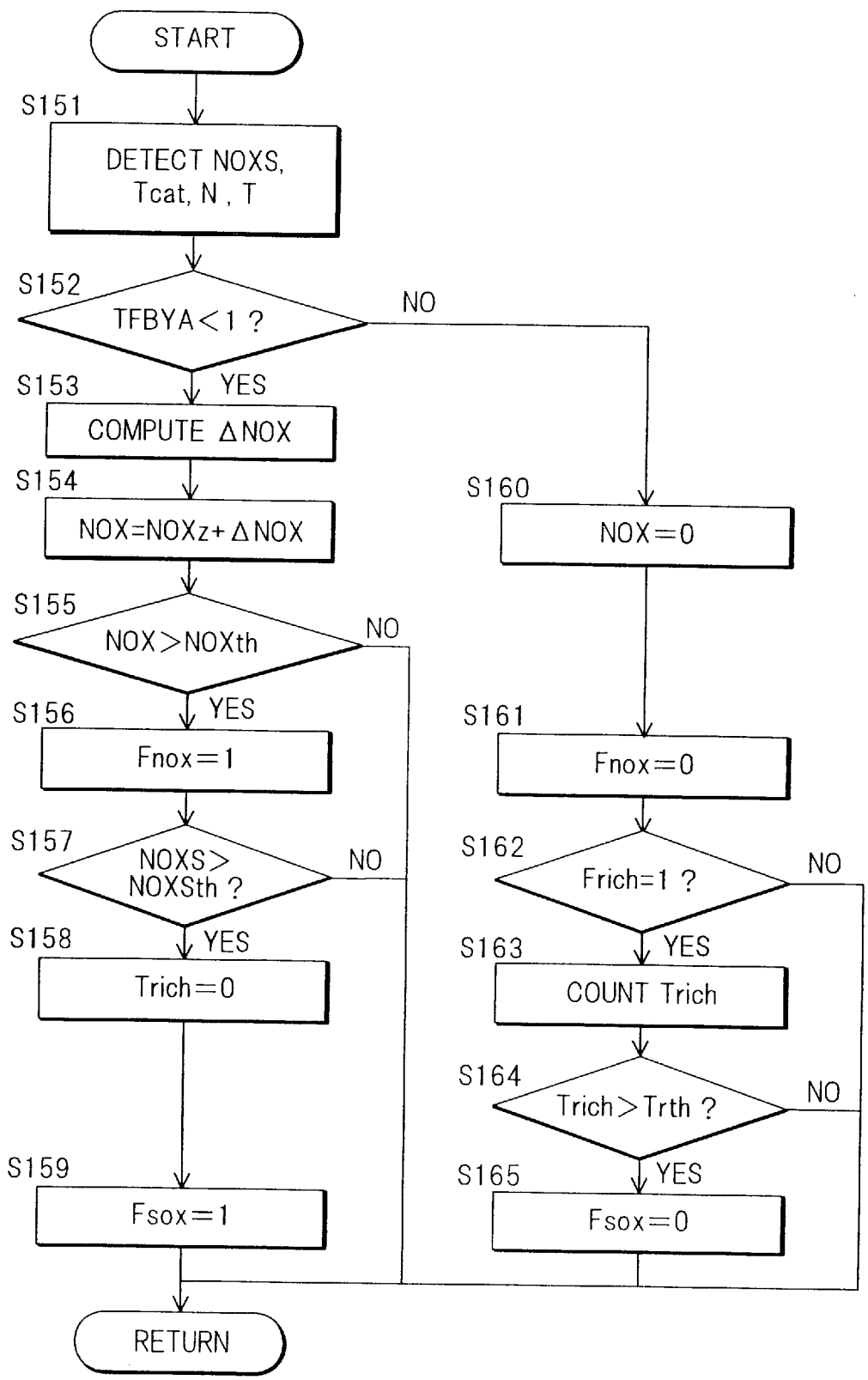
FIG. 20 shows a routine for determining SOx discharge conditions according to a second embodiment of this invention.

FIG. 20 shows a routine for determining SOx discharge conditions. This routine is performed by the controller 6 at a predetermined interval, for example 10 milliseconds.

First, in a step S151, the output of the NOx sensor 18 is A/D converted, and an NOx concentration signal NOXS is calculated. The output of the catalyst temperature sensor 12 is also A/D converted, and the catalyst temperature Tcat of the rear three-way catalyst 9 is calculated. The engine rotation speed N is also calculated based on the recurrence interval of a predetermined signal of the crank angle sensor 14, and the engine load T is calculated based on the output of the accelerator position sensor 15.

In a step S152, it is determined whether or not the air-fuel ratio is controlled to be lean based on the target equivalence ratio TFBYA. When the air-fuel ratio is controlled to lean, (TFBYA<1), the routine proceeds to a step S153, and when it is not, the routine proceeds to a step S160.

In a step S153, the NOx amount trapped in a predetermined time (here 10 milliseconds) by the rear three-way catalyst 9 is computed by the following equation:

$$\Delta NOX = (NOx \text{ amount which flows into the rear three-way catalyst } \mathbf{9} \text{ in a predetermined time}) \times (NOx \text{ trapping rate of rear three-way catalyst } \mathbf{9}) \quad (5)$$

The NOx amount flowing into the rear three-way catalyst 9 in the predetermined time is computed based on the rotation speed N of the engine 1, engine load T and average air-fuel ratio.

The NOx trapping rate (NOx amount trapped in unit time/NOx amount flowing in per unit time) of the rear three-way catalyst 9 is computed based on, for example, the present NOx storage amount (estimated value of NOx storage amount computed on the immediately preceding occasion) NOXz, catalyst temperature Tcat and average air-fuel ratio.

As the average air-fuel ratio, the target equivalence ratio TFBYA set in the target air-fuel ratio setting routine is used.

The NOx trapping rate of the rear three-way catalyst 9 is a value from zero to 1, and has the following characteristics.

The NOx trapping rate becomes larger as the NOx storage amount NOX of the rear three-way catalyst 9 decreases, and when the NOx storage amount NOX is zero, the NOx trapping rate is a maximum.

The NOx trapping rate is a maximum when the catalyst temperature Tcat of the rear three-way catalyst 9 is a predetermined temperature, and decreases when the catalyst temperature Tcat is lower than the predetermined temperature. It is zero at or below the catalyst activation temperature, and decreases the higher the temperature above the predetermined temperature.

The NOx trapping rate becomes smaller as the air-fuel ratio displays lower levels of leaness, and becomes zero at a rich air-fuel ratio.

In a step S154, the newest estimated NOx amount NOX is computed by adding $\Delta NOX$ to the estimated NOx amount NOXz computed on the immediately preceding occasion.

In a step S155, it is determined whether or not the estimated NOx amount NOX is greater than a predetermined amount NOXth. When it is greater than the predetermined amount NOXth, the routine proceeds to a step S156, and in other cases the routine is terminated. Here, the predetermined amount NOXth is set to the NOx storage tolerance of the rear three-way catalyst 9 or a slightly smaller value.

In a step S156, a flag Fnox is set to 1 which shows that the conditions for reducing the NOx stored in the rear three-way catalyst 9 are satisfied. After the flag Fnox is set to 1, control is performed by a routine, not shown, which temporarily makes the air-fuel ratio rich.

Figure 21:
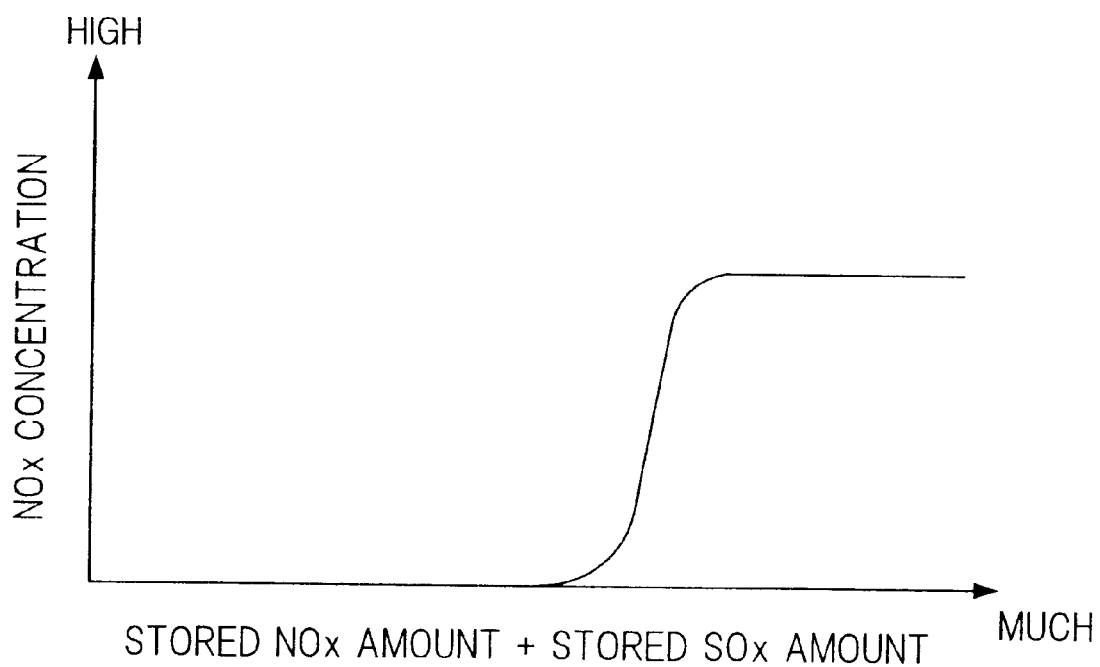
FIG. 21 is a figure showing the relation of the total amount of NOx and SOx stored in the rear three-way catalyst, and the NOx concentration downstream of the rear three-way catalyst.

In a step S157, it is determined whether or not an NOx concentration signal NOXS is greater than a permitted value NOXSth. The NOx trapping rate of the rear three-way catalyst 9 falls off the more the total amount of NOx and SOx stored in the rear three-way catalyst 9 increases, so if the total amount of NOx and SOx increases, the NOx concentration downstream of the rear three-way catalyst 9 will increase as shown in FIG. 21.

Therefore, by setting the permitted value NOXSOth to the NOx concentration corresponding to the NOx amount flowing out downstream when the permitted amount of SOx and the predetermined amount NOXth of NOx are stored in the rear three-way catalyst 9, it can be determined whether or not a predetermined amount or more of SOx is stored.

In a step S158, a counter Trich for measuring the elapsed time after rich air-fuel ratio conditions are satisfied, is reset to zero.

In a step S159, the flag Fsox which shows that SOx discharge conditions are satisfied, is set to 1.

On the other hand, in a step S160, the estimated NOx storage amount NOX is set to zero. This is because, if the air-fuel ratio is controlled to the stoichiometric air-fuel ratio or to rich, the NOx stored in the rear three-way catalyst 9 is rapidly reduced. In a step S161, the flag Fnox is set to zero.

In a step S162, it is determined whether or not rich air-fuel ratio conditions are satisfied. When rich air-fuel ratio conditions are satisfied (Frich=1), the routine proceeds to a step S163 and the counter Trich is counted. In other cases (Frich=0), this routine is terminated.

In a step S164, it is determined whether or not the elapsed time Trich after rich air-fuel ratio conditions are satisfied, exceeded a predetermined time Trth. When it is larger than the predetermined time Trth, it is determined that SOx stored in the rear three-way catalyst 9 has been discharged by setting the air-fuel ratio to rich for a predetermined time. The routine then proceeds to a step S165, and the flag Fsox is set to zero which shows that SOx discharge conditions are not satisfied.

For simplicity, in the computation of NOX, the step S153 may be omitted, and ΔNOX of the step S154 may be set to a fixed value.

Therefore, in this embodiment, it is determined whether or not to perform SOx discharge control of the rear three-way catalyst 9 based on the output of the NOx sensor 18 which installed downstream of the rear three-way catalyst 9.

Specifically, when the NOx amount stored in the rear three-way catalyst 9 exceeds a predetermined amount and the NOx concentration of the rear three-way catalyst 9 downstream of the rear three-way catalyst 9 exceeds a predetermined value, it is determined that SOx discharge conditions are satisfied. When the predetermined time Trth has elapsed after rich air-fuel ratio conditions are satisfied, it is determined that SOx discharge conditions are not satisfied.

Figure 22:
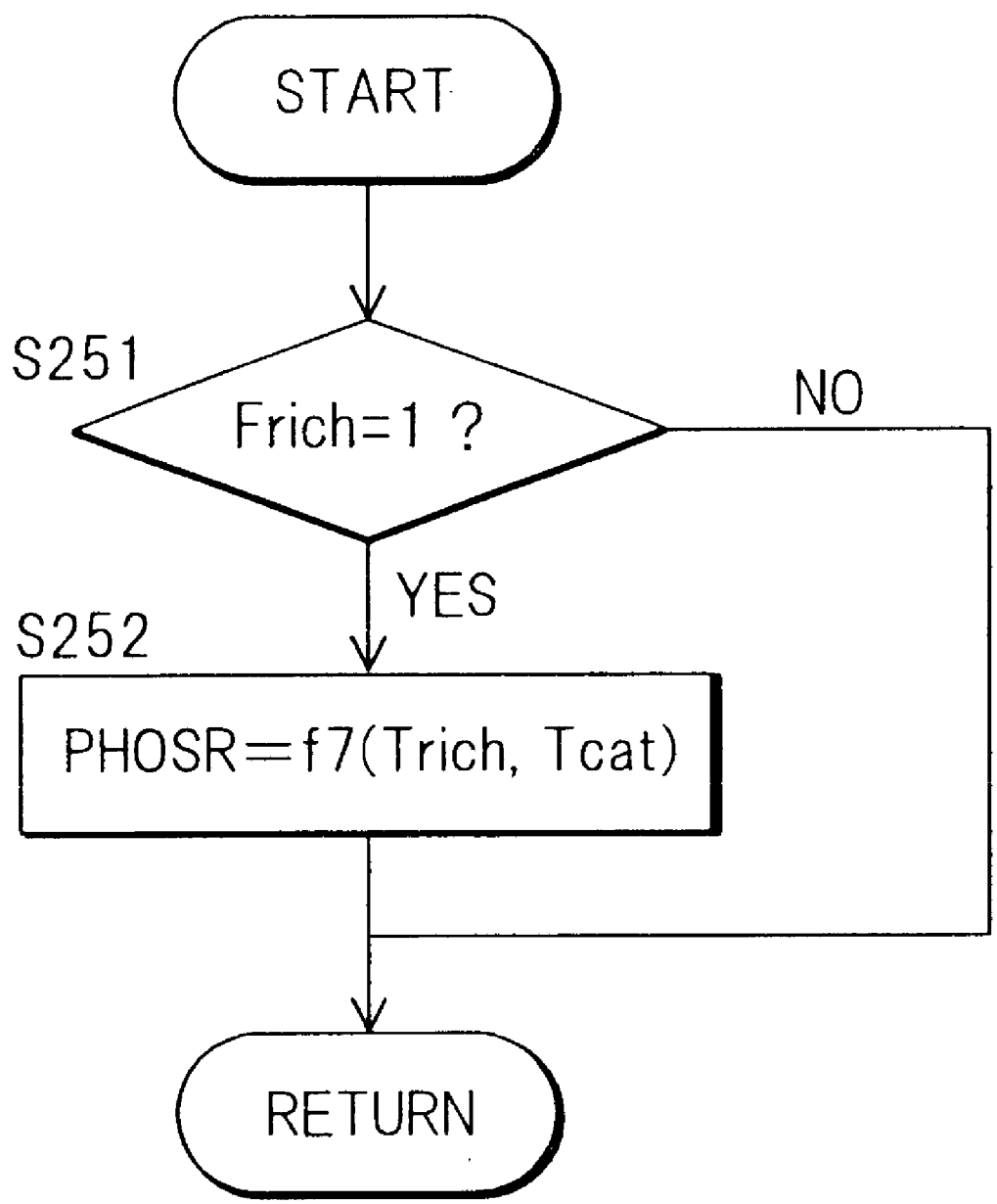
FIG. 22 shows a routine in the case of making PHOSR variable in the second embodiment.

When PHOSR is made variable in this second embodiment, the processing shown in FIG. 22 is further performed.

FIG. 22 is a routine for setting PHOSR to be variable in the second embodiment.

First, in a step S251, it is determined whether or not rich air-fuel ratio conditions are satisfied based on the flag Frich. When rich air-fuel ratio conditions are satisfied (Frich=1), the routine proceeds to a step S252, otherwise (Frich=0) the routine is terminated.

In a step S252, PHOSR is computed by a function f7.

Here, the function f7 is determined so that the richness decided by PHOSR has the following characteristics.

The richness decreases the longer the elapsed time Trich after rich air-fuel ratio conditions are satisfied, and is zero when Trich=Trth.

The richness decreases the lower the catalyst temperature Tcat of the rear three-way catalyst 9, and is zero when the catalyst temperature Tcat is less than the SOx discharge temperature.

A third embodiment will now be described.

The routine for determining SOx discharge conditions according to the third embodiment differs from that of the first embodiment.

Figure 23:
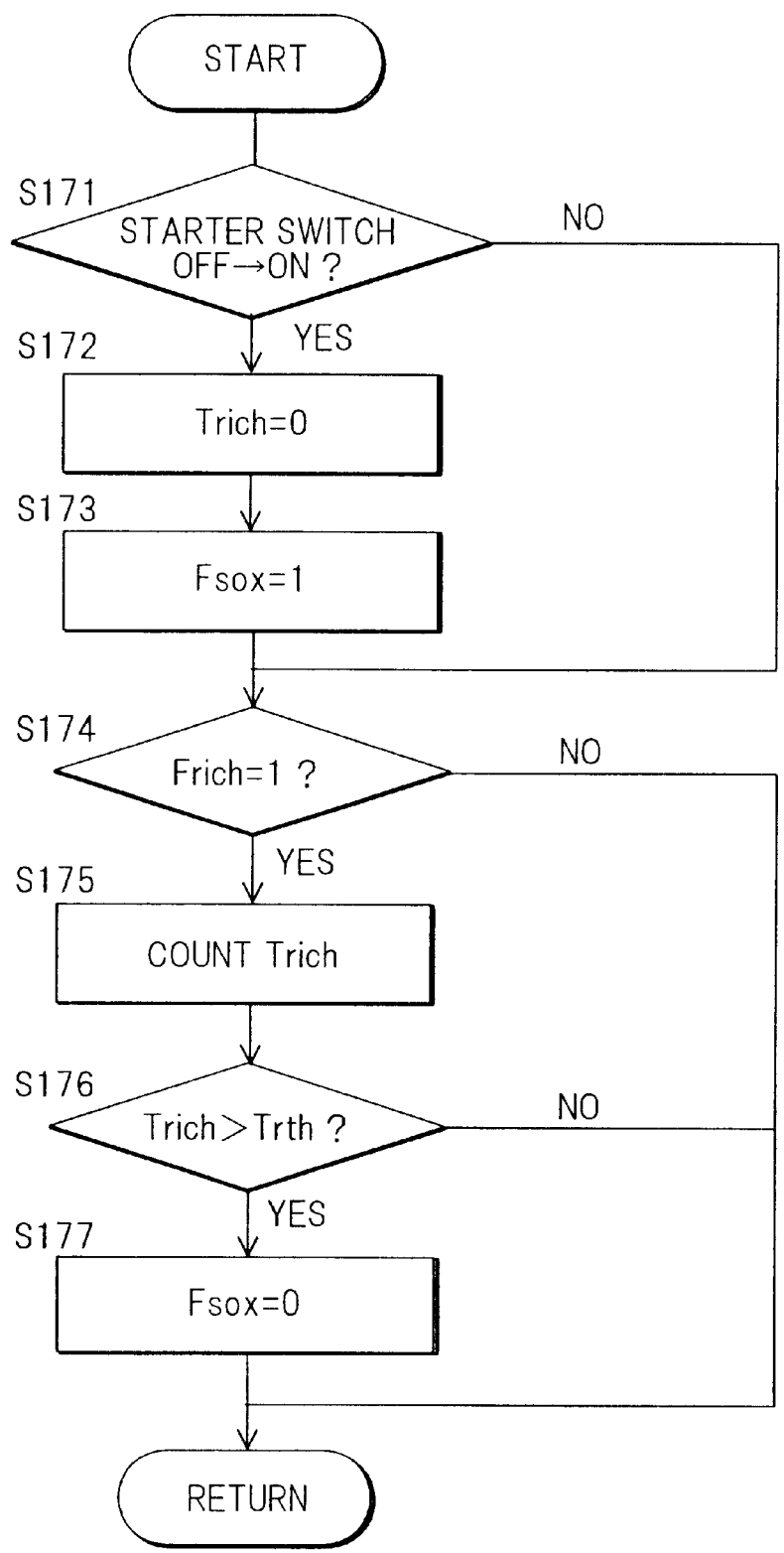
FIG. 23 shows a routine for determining SOx discharge conditions according to a third embodiment of this invention.

FIG. 23 shows the routine for determining SOx discharge conditions. This routine is performed at a predetermined interval, for example, 10 milliseconds, by the controller 6.

First, in a step S171, it is determined whether the timing is immediately after engine startup based on the variation of the output signal from the starter switch 17. When the output signal from the starter switch 17 varies from OFF to ON, it is determined that the timing is immediately after startup and the routine proceeds to a step S171, otherwise it proceeds to a step S174.

In a step S172, the variable Trich is set to zero. In a step S173, the flag Fsox is set to 1.

In a step S174, it is determined whether the rich air-fuel ratio conditions are satisfied based on the flag Frich. When it is determined that rich air-fuel ratio conditions are satisfied (Frich=1), the routine proceeds to a step S175, otherwise (Frich=0) the routine is terminated.

In the step S175, Trich is counted. In a step S176, it is determined whether Trich exceeded the predetermined value Trth. When it is determined that Trich exceeded Trth, the routine proceeds to a step S177, and the flag Fsox is set to zero which shows that SOx discharge conditions are not satisfied. In other cases, the routine is terminated.

Therefore, in this embodiment, it is determined that the SOx discharge conditions are satisfied until a predetermined time has elapsed since rich air-fuel ratio conditions are satisfied after engine startup.

As a result, SOx discharge control is always performed once every time the vehicle runs.

The entire contents of Japanese Patent Application P11-72319 (filed Mar. 17, 1999) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed:

1. An exhaust emission control device of an internal combustion engine provided with an exhaust gas pipe, comprising:
   a front three-way catalyst disposed in said exhaust gas pipe,
   a rear three-way catalyst disposed in said exhaust gas pipe, said rear three-way catalyst being provided downstream of said front three-way catalyst, and a microprocessor programmed to:
control said engine so that an air-fuel ratio of the exhaust gas flowing into said front three-way catalyst is made to periodically fluctuate to rich or lean about the stoichiometric air-fuel ratio,
increase the amplitude of air-fuel ratio fluctuation when the temperature of said rear three-way catalyst is raised, and
lessen the degree of increase in the amplitude of air-fuel ratio fluctuation with increasing levels of deterioration of said front three-way catalyst.

2. An exhaust emission control device as defined in claim 1, wherein said microprocessor is further programmed to:
control the amplitude of air-fuel ratio fluctuation to be less than the amplitude at which the front three-way catalyst can effectively purify HC, CO and NOx in the exhaust gas when the temperature of said rear three-way catalyst is not raised, and
control the amplitude of air-fuel ratio fluctuation to be larger than the amplitude at which said front three-way catalyst can effectively purify HC, CO and NOx in the exhaust gas when the temperature of said rear three-way catalyst is raised.

3. An exhaust emission control device as defined in claim 2, wherein said microprocessor is further programmed to:
control the amplitude of air-fuel ratio fluctuation to be less than the amplitude at which said rear three-way catalyst can effectively purify HC, CO and NOx in the exhaust gas when the temperature of said rear three-way catalyst is raised.

4. An exhaust emission control device as defined in claim 1 further comprising a sensor which detects the air-fuel ratio of the exhaust gas flowing into said front three-way catalyst, and wherein said microprocessor is further programmed to:
feedback control the air-fuel ratio of said engine to a target air-fuel ratio based on the detected air-fuel ratio, and
increase the feedback control gain to increase the amplitude of air-fuel ratio fluctuation.

5. An exhaust emission control device as defined in claim 1, wherein said microprocessor is further programmed to control the average value of the air-fuel ratio to the stoichiometric air-fuel ratio when the temperature of said rear three-way catalyst is raised.

6. An exhaust emission control device as defined in claim 1, wherein the oxygen storage capacity of said front three-way catalyst is less than the oxygen storage capacity of said rear three-way catalyst.

7. An exhaust emission control device as defined in claim 1, wherein said rear three-way catalyst is a catalyst which traps and reduces NOx according to the air-fuel ratio of the exhaust gas flowing into said rear three way catalyst.

8. An exhaust emission control device as defined in claim 7, wherein said microprocessor is further programmed to:
determine whether or not conditions for discharging SOx stored in said rear three-way catalyst are satisfied, and
raise the temperature of said rear three-way catalyst when conditions for discharging SOx stored in said rear three-way catalyst are satisfied.

9. An exhaust emission control device as defined in claim 8, further comprising a sensor for detecting start-up of said engine, and said microprocessor is further programmed to determine that conditions for discharging SOx stored in said rear three-way catalyst are satisfied when start-up of said engine is detected.

10. An exhaust emission control device as defined in claim 8, wherein said microprocessor is further programmed to estimate an SOx amount stored in said rear three-way catalyst, and determine whether or not conditions for discharging SOx stored in said rear three-way catalyst are satisfied based on said estimated SOx storage amount.

11. An exhaust emission control device as defined in claim 8, further comprising a sensor which detects an NOx concentration in the exhaust gas flowing out of said rear three-way catalyst, and wherein said microprocessor is further programmed to:
estimate a NOx storage amount stored in said rear three-way catalyst and
determine that conditions for discharging SOx stored in said rear three-way catalyst are satisfied based on the detected NOx concentration and estimated NOx storage amount.

12. An exhaust emission control device as defined in claim 11, wherein said microprocessor is further programmed to determine that conditions for discharging SOx stored in said rear three-way catalyst are satisfied when the estimated NOx storage amount stored in said rear three-way catalyst is greater than a predetermined amount, and the detected NOx concentration is greater than a predetermined concentration.

13. An exhaust emission control device as defined in claim 8, further comprising a sensor which detects running conditions and wherein said microprocessor is further programmed to stop raising the temperature of said rear three-way catalyst when the detected running conditions are outside a predetermined SOx discharge running region, regardless of whether the conditions for discharging SOx stored in said rear three-way catalyst are satisfied or not.

14. An exhaust emission control device as defined in claim 8, further comprising a sensor which detects a temperature of said rear three-way catalyst, and wherein said microprocessor is further programmed to stop raising the temperature of said rear three-way catalyst when the detected temperature of said rear three-way catalyst is greater than a predetermined temperature greater than the SOx discharge temperature, regardless of whether the conditions for discharging SOx stored in said rear three-way catalyst are satisfied or not.

15. An exhaust emission control device as defined in claim 8, further comprising a sensor which detects the temperature of said rear three-way catalyst, and wherein said microprocessor is further programmed to control the average air-fuel ratio fluctuation to rich when conditions for discharging SOx stored in said rear three-way catalyst are satisfied, and the temperature of said rear three-way catalyst is greater than the SOx discharge temperature.

16. An exhaust emission control device as defined in claim 15, wherein said microprocessor is further programmed to increase the degree of richness the greater the SOx amount stored in said rear three-way catalyst.

17. An exhaust emission control device as defined in claim 15, wherein said microprocessor is further programmed to decrease the degree of richness the longer the elapsed time from start of rich air-fuel ratio control.

18. An exhaust emission control device as defined in claim 1, wherein said microprocessor is further programmed to retard the ignition timing of said engine when the temperature of said rear three-way catalyst is raised.

19. An exhaust emission control device as defined in claim 1, wherein said microprocessor is further programmed to advance the ignition timing of said engine when the temperature of said rear three-way catalyst is raised.

20. An exhaust emission control device of an internal combustion engine provided with an exhaust gas pipe, comprising:

a front three-way catalyst disposed in said exhaust gas pipe, a rear three-way catalyst disposed in said exhaust gas pipe, said rear three-way catalyst being provided downstream of said front three-way catalyst, and a microprocessor programmed to:
- control said engine so that an air-fuel ratio of the exhaust gas flowing into said front three-way catalyst is made to periodically fluctuate to rich or lean about the stoichiometric air-fuel ratio,
- increase the amplitude of air-fuel ratio fluctuation when the temperature of said rear three-way catalyst is raised, wherein said rear three-way catalyst is a catalyst which traps and reduces NOx according to the air-fuel ratio of the exhaust gas flowing into said rear three way catalyst,
- determine whether or not conditions for discharging SOx stored in said rear three-way catalyst are satisfied,
- raise the temperature of said rear three-way catalyst when conditions for discharging SOx stored in said rear three-way catalyst are satisfied,
- estimate an SOx amount stored in said rear three-way catalyst, and determine whether or not conditions for discharging SOx stored in said rear three-way catalyst are satisfied based on said estimated SOx storage amount,
- determine that conditions for discharging SOx stored in said rear three-way catalyst are satisfied when the estimated SOx storage amount is greater than a first predetermined amount, and
- determine that conditions for discharging SOx stored in said rear three-way catalyst are not satisfied when the estimated SOx storage amount is less than a second predetermined amount less than said first predetermined amount.

21. An exhaust emission control device of an internal combustion engine provided with an exhaust gas pipe, comprising:

a front three-way catalyst disposed in said exhaust gas pipe, a rear three-way catalyst disposed in said exhaust gas pipe, said rear three-way catalyst being provided downstream of said front three-way catalyst, means for controlling said engine so that an air-fuel ratio of the exhaust gas flowing into said front three-way catalyst is made to periodically fluctuate to rich or lean about the stoichiometric air-fuel ratio, means for increasing the amplitude of air-fuel ratio fluctuation when the temperature of said rear three-way catalyst is raised, and means for lessening the degree of increase in the amplitude of air-fuel ratio fluctuation with increasing levels of deterioration of said front three-way catalyst.

* * * * *